(12) United States Patent
Asao et al.

(10) Patent No.: US 8,134,582 B2
(45) Date of Patent: Mar. 13, 2012

(54) COLOR DISPLAY APPARATUS

(75) Inventors: Yasufumi Asao, Atsugi (JP); Kohei Nagayama, Kawasaki (JP); Ryuichiro Isobe, Atsugi (JP); Hideo Mori, Yokohama (JP); Hironao Tanaka, Yamato (JP); Hiroshi Matsuda, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 984 days.

(21) Appl. No.: 10/552,985

(22) PCT Filed: May 13, 2005

(86) PCT No.: PCT/JP2005/009216
§ 371 (c)(1),
(2), (4) Date: Jul. 10, 2007

(87) PCT Pub. No.: WO2005/111706
PCT Pub. Date: Nov. 24, 2005

(65) Prior Publication Data
US 2009/0121992 A1    May 14, 2009

(30) Foreign Application Priority Data

May 14, 2004  (JP) ................................ 2004-145725

(51) Int. Cl.
*G02F 1/1335* (2006.01)
*G09G 3/36* (2006.01)
(52) U.S. Cl. ............................. 345/694; 345/88; 345/690
(58) Field of Classification Search .................... 345/88, 345/690, 694, 697
See application file for complete search history.

(56) References Cited

U.S. PATENT DOCUMENTS

| | | | | |
|---|---|---|---|---|
| 4,813,770 A | * | 3/1989 | Clerc et al. | 349/74 |
| 4,877,309 A | * | 10/1989 | Takamatsu | 349/80 |
| 5,404,236 A | | 4/1995 | Hartmann et al. | |
| 5,796,378 A | * | 8/1998 | Yoshida et al. | 345/88 |
| 5,841,492 A | * | 11/1998 | Iwauchi et al. | 349/74 |
| 5,841,494 A | * | 11/1998 | Hall | 349/98 |
| 6,014,195 A | | 1/2000 | Sakamoto et al. | |
| 6,038,001 A | * | 3/2000 | Ono et al. | 349/33 |
| 6,466,280 B1 | | 10/2002 | Park et al. | |
| 6,621,543 B2 | * | 9/2003 | Moon | 349/115 |
| 7,268,757 B2 | * | 9/2007 | Ben-David et al. | 345/88 |
| 2005/0243047 A1 | | 11/2005 | Asao | |
| 2005/0248714 A1 | | 11/2005 | Asao | |
| 2006/0055713 A1 | | 3/2006 | Asao et al. | |

FOREIGN PATENT DOCUMENTS

| | | |
|---|---|---|
| EP | 0 846 975 | 6/1998 |
| JP | 04-052625 | 2/1992 |
| JP | 11/202804 | 7/1999 |
| JP | 2001-272956 | 10/2001 |
| WO | 2004/042687 | 5/2004 |

* cited by examiner

*Primary Examiner* — Amr Awad
*Assistant Examiner* — Stephen Bray
(74) *Attorney, Agent, or Firm* — Fitzpatrick, Cella, Harper & Scinto

(57) ABSTRACT

A color display apparatus is of the type wherein a unit pixel is constituted by at least three subpixels including first to third subpixels, and at each subpixel, a medium for changing an optical property depending on a voltage applied thereto is disposed. The color display apparatus includes means for applying a voltage, to each of the first to third subpixels, for changing the optical property of the medium within a brightness change range in which light passing through the medium is changed in brightness and a hue change range in which the light passing through the medium assumes chromatic color and a hue of the chromatic color is changed while including combinations of red and green, red and blue, and green and blue for the first to third subpixels, respectively.

8 Claims, 11 Drawing Sheets

COLOR DISPLAY APPARATUS

TECHNICAL FIELD

The present invention relates to a color display apparatus.

BACKGROUND ART

At present, a flat-panel display as an embodiment of a color display apparatus has widely been popularized as various monitors for a personal computer and the like and as a display apparatus for a cellular phone, and so on. In the future, the flat-panel display is expected to follow popularization more and more, such as development in use for big-screen television.

A most popular flat-panel display is a liquid crystal display apparatus. As a color display method for the liquid crystal display apparatus, one called a micro-color filter method has been used widely.

The micro-color filter method effects full-color display by constituting one unit pixel with at least three pixels and providing the three pixels with color filters of three primary colors of red (R), green (G), and blue (B), respectively, thus having an advantage of readily realizing a high color-reproducing performance.

On the other hand, as a disadvantage of the micro-color filter method, a transmittance is ⅓ of a monochromatic display method, so that a light utilization efficiency is low.

This low light utilization efficiency leads to a high power consumption of a back light or a front light in a transmission-type liquid crystal display apparatus having the back light or a reflection-type liquid crystal display apparatus having the front light.

On the other hand, a display device having complementary color filters of yellow (Y), cyan (C), and magenta (M), not the RGB color filters has been proposed ("Preprint of the Japanese Liquid Crystal Society Annual Meetings 1998", pp. 324~). However, it was impossible to display high-purity primary colors only by applying the YMC color filters to a monochromatic display device simply based on a conventional concept.

Incidentally, in recent years, as a liquid crystal display device used in a liquid crystal display apparatus, a transflective (semi-transmission)-type liquid crystal display device having a light reflective area as a part of display area and a light transmissive area as a part of display area has been proposed in U.S. Pat. No. 6,466,280. Such a transflective-type liquid crystal display device has been widely used in a cellular phone, a mobile data terminal, etc. Incidentally, a portable electronic apparatus is used outdoors in many cases, so that the apparatus is required that it ensures not only a sufficient viewability in extremely bright extraneous light but also a high contrast and a good color reproducibility even in a dark room.

Further, there have been recently reported some display devices, as electronic paper display, excellent in viewability compared with the liquid crystal display device. Most of the display devices are intended to realize bright display without using a polarization plate. However, such display devices realizes bright display of monochromatic color but having failed to realize color display with a brightness comparable to that of paper as yet because they have no choice but to use a color filter similarly as in the liquid crystal display device.

On the other hand, as a color liquid crystal display apparatus for effecting color display without using the color filter, a display apparatus using an electrically controlled birefringence (ECB)-type liquid crystal display device has been known. The ECB-type liquid crystal display device is constituted by a pair of substrates and liquid crystal sandwiched between the substrates, and is roughly classified into those of a transmission-type, in which each of the pair of substrates is provided outside with a polarization plate, and a reflection-type.

In the case of the ECB-type liquid crystal display device of the reflection-type, there are one-polarization plate type display device in which only one of the substrates is provided with a polarization plate and two-polarization plate type display device in which both of the substrates are provided with a polarization plate and a reflection plate is disposed outside each of the polarization plate.

In the case of the ECB-type liquid crystal display device of the transmission-type, linearly polarized light which comes in through one of the polarization plates is changed into elliptically polarized light consisting of respective wavelength light fluxes different in state of polarization by the action of birefringence of liquid crystal layer in a process of transmitting a liquid crystal cell. The elliptically polarized light enters the other polarization plate and the transmitted light having passed through the other polarization plate is colored light consisting of light fluxes of colors corresponding to light intensities of the respective wavelength light fluxes.

As described above, the ECB-type liquid crystal display device is capable of coloring light by utilizing the birefringence action of the liquid crystal layer of the liquid crystal cell and the polarization action of polarization plate, so that it causes no light absorption by the color filter, thus effecting bright color display at a high transmittance of light. In addition, the birefringence of the liquid crystal layer is changed depending on a voltage applied to the liquid crystal cell, so that by controlling the voltage applied to the liquid crystal cell, it is possible to change the color of the transmitted light or the reflected light. By utilizing this, it is possible to display a plurality of colors at one (the same) pixel.

FIG. 14 is a chromaticity diagram showing a relationship between an amount of birefringence (called retardation R) of the ECB-type liquid crystal display device and coordinates. From FIG. 14, it is found that the color at a retardation R from 0 to about 250 nm is achromatic color since the retardation range is located substantially at a center portion of the chromaticity diagram but is changed when the retardation exceeds the retardation range.

When a liquid crystal material having a negative dielectric anisotropy ($-\Delta\in$) is used as the liquid crystal and liquid crystal molecules thereof are homeotropically (vertically) aligned with respect to the substrates, the liquid crystal molecules are inclined with voltage, so that an amount of birefringence is increased with a degree of the inclination of the liquid crystal molecules.

In this case, in a cross-nicol condition, the chromaticity is changed along a curve indicated in FIG. 14. More specifically, when the voltage is not applied, the retardation R is substantially zero, so that light does not pass through the display device to provide a dark (black) state. With an increase in voltage, brightness is increased in the order of black, gray, and white. When the voltage is further increased, the light is colored to change the color in the order of yellow, red, violet, blue, yellow, violet, light blue, and green.

As described above, under voltage application, the ECB-type liquid crystal display device is capable of changing the brightness between a maximum brightness and a minimum brightness in a modulation range on a low voltage side under and changing a plurality of hues.

Incidentally, as shown in FIG. 14, the color obtained by the change in retardation has a color purity which is considerably lower than those of colors having maximum purities which are located on an outer edge of the chromaticity distribution. As a method of compensating such a low purity, color filter is used in combination with the liquid crystal cell as described in Japanese Laid-Open Patent Application (JP-A) No. Hei 04-05265, whereby the color of ECB display is increased in purity by passing the light through a color filter of the same color. In the method described in JP-A Hei 04-052625, in order to obtain high-purity red, a pixel which is not used for blue display is provided with a red-type color filter or a yellow-type color filter to cut a red (short) wavelength component obtained by the ECB effect, thus providing high-purity red.

Hereinbelow, the range of retardation (0 to 250 nm) in which the brightness is changed in the order of black, gray, and white on the chromaticity diagram is referred to as a "brightness change range", and a range of retardation (not less than 250 nm) in which chromatic color not less than yellow is changed is referred to as a "hue change range". However, a border between the achromatic color and the chromatic color is not determined clearly, so that the border of 250 nm should be understood as a certain index thereof.

Incidentally, in the present invention, the color obtained by retardation (retardation change) is referred to but it means the color along the curve shown in FIG. 14. On the curve, three points at which the purity is maximum are located close to positions where the retardation is 450 nm, 600 nm and 1300 nm, and the color is visually recognized as red, green, and blue, respectively. However, before and after each of the three points, there is a 100 nm-range in which the color is substantially regarded as the corresponding color (red, green or blue), so that in the present invention, the colors in such ranges are also referred to as red, green and blue, respectively. Magenta is located at a point of 530 nm between the ranges of red and blue.

Generally, the color of color filter used in the liquid crystal display apparatus has a higher purity than that obtained by retardation, so that it is located outside the above described chromaticity distribution on the chromaticity diagram shown in FIG. 14. In the present invention, however, such color is also referred to as the same color.

Incidentally, the liquid crystal display apparatus (color display apparatus) using the conventional ECB-type liquid crystal display device was capable of effecting color display. However, this color display was based on a change in hue achieved by utilizing the birefringence effect, so that it was possible to control the hue by an amount of a voltage applied to the liquid crystal layer but it was difficult to obtain a high-purity display color. Further, for displaying green, the color display apparatus had no choice but to use a high retardation value of 1300 nm. In addition, it was also difficult to display smooth gradation color at the hue.

Accordingly, the color display was only effected with the limited number of display colors.

DISCLOSURE OF THE INVENTION

In view of the above described circumferences, the present invention has been accomplished.

An object of the present invention is to provide a color display apparatus capable of improving a light utilization efficiency.

Another object of the present invention is to provide a color display apparatus capable of effecting multi-color display.

According to a first aspect of the present invention, there is provided a color display apparatus of the type wherein a unit pixel is constituted by at least three subpixels including first to third subpixels, and at each subpixel, a medium for changing an optical property depending on a voltage applied thereto is disposed the color display apparatus comprising:

means for applying a voltage, to the first subpixel, for changing the optical property of the medium within a brightness change range in which light passing through the medium is changed in brightness and a hue change range in which the light passing through the medium assumes chromatic color and a hue of the chromatic color is changed while including red and green, means for applying a voltage, to the second subpixel, for changing the optical property of the medium within a brightness change range in which light passing through the medium is changed in brightness and a hue change range in which the light passing through the medium assumes chromatic color and a hue of the chromatic color is changed while including red and blue, and means for applying a voltage, to the third subpixel, for changing the optical property of the medium within a brightness change range in which light passing through the medium is changed in brightness and a hue change range in which the light passing through the medium assumes chromatic color and a hue of the chromatic color is changed while including green and blue.

In the color display apparatus according to the first aspect of the present invention, the hue change range of the medium is used when the three primary colors of red, green and blue, so that it is possible to not only improve the light utilization efficiency but also effect the multi-color display.

According to a second aspect of the present invention, there is provided a color display apparatus of the type wherein a unit pixel is constituted by a plurality of subpixels including a plurality of first subpixels and a plurality of second subpixels, and at each subpixel, a medium for changing an optical property depending on a voltage applied thereto is disposed, the color display apparatus comprising:

a means for applying a voltage, to the plurality of first subpixels, for changing the optical property of the medium within a brightness change range in which light passing through the medium is changed in brightness and a hue change range in which the light passing through the medium assumes chromatic color and a hue of the chromatic color is changed, means for applying a voltage, to the plurality of second subpixels, for changing the optical property of the medium within a brightness change range in which the light passing through the medium is changed in brightness, and two color filters of two colors selected from three colors of red, green and blue, provided to at least two subpixels, respectively, of the plurality of second subpixels.

In the color display apparatus according to the second aspect of the present invention, the plurality of pixels are constituted by the plurality of first subpixels at which color display is effected in a hue change-based modulation area and the plurality of second subpixels provided with the two color filters of different colors selected from red, green and blue, These and other objects, features and advantages of the present invention will become more apparent upon a consideration of the following description of the preferred embodiments of the present invention taken in conjunction with the accompanying drawings.

BEST MODE FOR CARRYING TO THE INVENTION

Hereinbelow, embodiments of the present invention will be described with reference to the drawings.

First Embodiment

Figure 1:
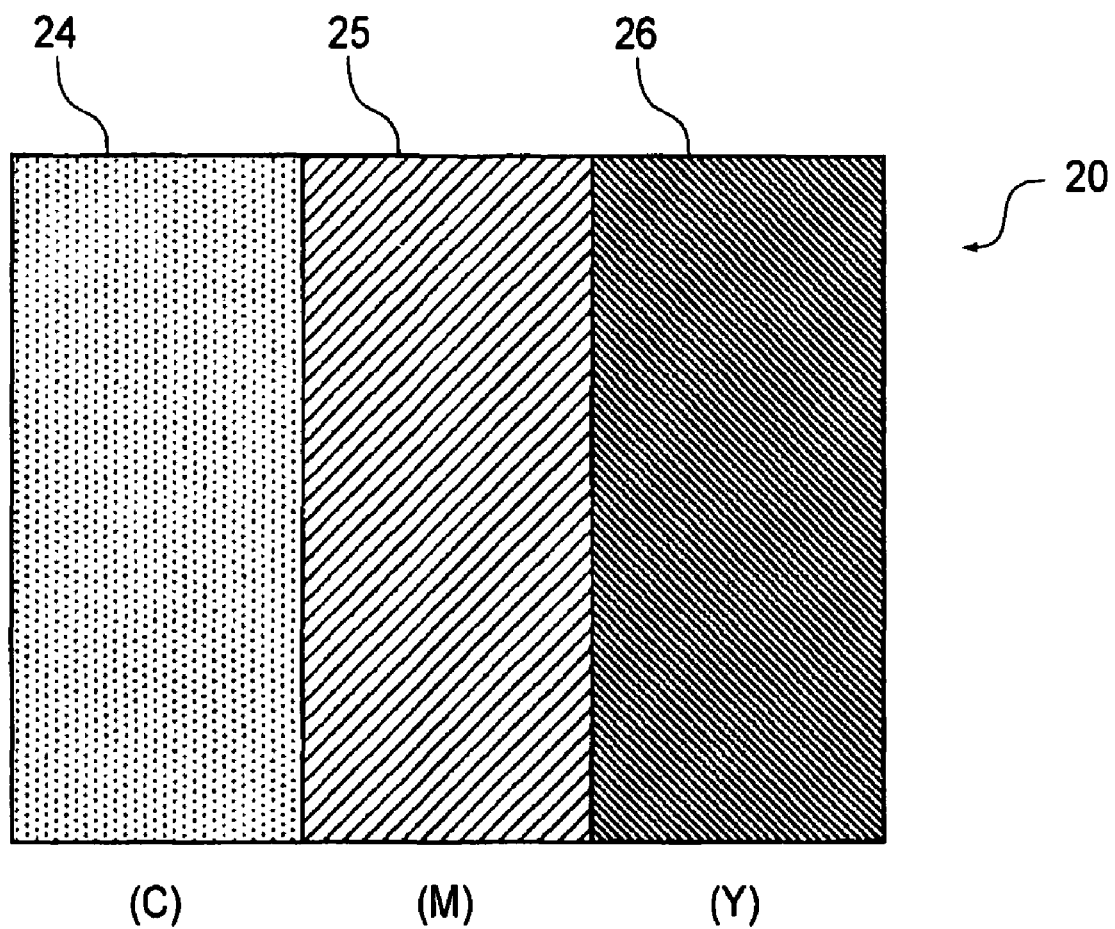
FIG. 1 is a view showing a one pixel structure of color (liquid crystal) display device used in a color display apparatus according to First Embodiment of the present invention.

FIG. 1 shows a one pixel structure of a color display device used in a color display apparatus in this embodiment.

Hereinafter, a color display operation principle of the color display device will be described. The color display device used in the color display apparatus of the present invention may be those of various types. The display principle thereof will be described while taking a liquid crystal display device using a vertical (homeotropic) alignment (VA) mode on the basis of electrically controlled birefringence (ECB) effect, as an example.

As shown in FIG. 1, in the color (liquid crystal) display device in this embodiment, one pixel 20 is divided into a plurality of subpixels 24, 25 and 26 (three subpixels in this case) which are provided with color filters of yellow (Y), magenta (M), and cyan (C), respectively.

Here, at all the subpixels 24, 25 and 26, it is possible to utilize a change in luminance of achromatic color from black to white by appropriately adjusting a retardation of a liquid crystal layer. For example, at the time of displaying white, the colors of the color filters of YMC are displayed. In this case, when all the liquid crystal layers are placed in a white display state, at the subpixels 25 to 26, the white display state is obtained by additive color mixture of YMC. As a result, the white display can be effected at the entire pixel.

Generally, in the case of white display only by additive color mixture of RGB, a resultant light utilization efficiency is lowered to ⅓ of that in the case of white display without using the color filters. However, in the case of the white display by additive color mixture of YMC, it is possible to obtain a light utilization efficiency which is two times that in the case of the white display by additive color mixture of RGB.

A color display method using the above described YMC color filters is the same as that using the ordinary micro-color filter method. In the liquid crystal display device of this embodiment, however, chromatic color is displayed by changing a retardation of the liquid crystal layer.

For example, at the subpixel 25 provided with the magenta color filter, in a smaller retardation area, a display color ranges from black to white by the liquid crystal layer alone, as described above. In this case, the color of the color filter is observed, so that it becomes possible to effect continuous gradation display from black to bright magenta through dark magenta. Further, in a larger retardation area, interference color on the basis of the ECB effect can be displayed by the liquid crystal layer alone, so that it is possible to display any color from red to blue through magenta.

The magenta color filter is capable of displaying all these colors of red, magenta and blue, so that the display state red, magenta and blue is still observed even after light passes through the magenta color filter. Incidentally, even in the case where the coloring by the retardation of the liquid crystal layer alone is yellow, it is possible to effect red display by subtractive color mixture principle of yellow and magenta by passing the light through the magenta color filter. In other words, with respect to the primary color display, by the effect of subtractive color mixture with the color filter, it is also possible to effect control so as to provide a display color different in color system from the retardation color by the liquid crystal layer alone.

Incidentally, with respect to blue, it is possible to display blue at a relatively high color purity by the retardation-based coloring, so that the blue display can be effected as it is even after the light passes through the magenta color filter. Alternatively, cyan is displayed by the retardation-based coloring and the light is caused to pass through the magenta color filter to effect high-purity blue display.

Further, on the same display principle, it becomes possible to effect display of blue, cyan and green at the cyan subpixel 24 by utilizing the ECB effect. In this case, in order to provide green only by the retardation color, a larger amount of retardation is required as described above. In order to display green at this subpixel 24, it is also possible to effect yellow display by the liquid crystal layer alone.

Here, the retardation-based yellow display can be realized by a relatively small retardation amount which is somewhat larger than the retardation for monochromatic display, so that it becomes possible to easily realize display of high-purity green by subtractive color mixture principle of the yellow of the liquid crystal layer and the cyan of the cyan color filter.

With respect to blue, as described above, it is possible to display high-purity blue only by the retardation color, so that it is sufficient to use the retardation color as it is. Alternatively, it is also possible to effect blue display by subtractive color mixture principle of the retardation-based magenta display with the cyan color filter.

Further, on the same display principle, it becomes possible to effect display of green, yellow and red at the yellow subpixel 26 by utilizing the ECB effect. In this case, in order to provide green only by the retardation color, a larger amount of retardation is required as described above. In order to display green at this subpixel 26, it is also possible to effect cyan display by the liquid crystal layer alone.

The retardation-based cyan display can be realized by a relatively easily realizable designed value of retardation which is somewhat larger than the retardation for blue display, so that it becomes possible to easily realize display of high-purity green by subtractive color mixture principle of the cyan of the liquid crystal layer and the yellow of the cyan color filter.

With respect to red, it is possible to display high-purity blue only by the retardation color but as described above, a resultant color purity is lowered compared with the case of using the red color filter. Accordingly, magenta display is effected by the retardation color in the liquid crystal layer. In combination therewith, it is possible to effect high-purity red display by subtractive color mixture principle of the retardation-based magenta display with the yellow color filter.

Incidentally, in this embodiment, explanation is made by the case of using the complementary color filters of three types of YMC. However, it is also possible to effect good color display, e.g., in such a case that a color filter of one color of the color filters of the three types is omitted.

For example, even in the case of a display device having pixels each consisting of three subpixels including the subpixels 24 and 25 provided with the magenta color filter and the cyan color filter, respectively, and a subpixel provided with no color filter, by effecting control so that white display is effected by the liquid crystal layer alone at the magenta and cyan subpixels 24 and 25, it is possible to display blue which is the color of the color filters (by additive color mixture of magenta and cyan). On the other hand, at the subpixel provided with no color filter, yellow display is effected by the retardation-based coloring. As a result, it is possible to effect white display by additive color mixture of all these colors.

Further, at the magenta subpixel and the cyan subpixel, it is possible to effect display of the three primary colors with high purity in a relatively small retardation amount. In other words, in the display device used in this embodiment, it becomes possible to effect good display of the primary colors when at least one color filter of the YMC color filters is disposed.

Next, displayable colors based on the above described display principle will be described more specifically. Incidentally, in the present invention, it is sufficient to provide at least one of the YMC color filters as described above. In the following description, however, explanation will be made on the assumption that the respective subpixels are provided with the three types of YMC color filters, respectively.

In this embodiment, a unit pixel is constituted by first subpixels (first subpixel group) 24 to 26 at which chromatic color is displayed by changing the retardation of the liquid crystal layer through voltage application by modulation means capable of controlling an unshown power source. The subpixels (subpixel group) 24 to 26 are provided with the color filters of YMC complementary to RGB of the RGB color filters, respectively.

Figure 2:
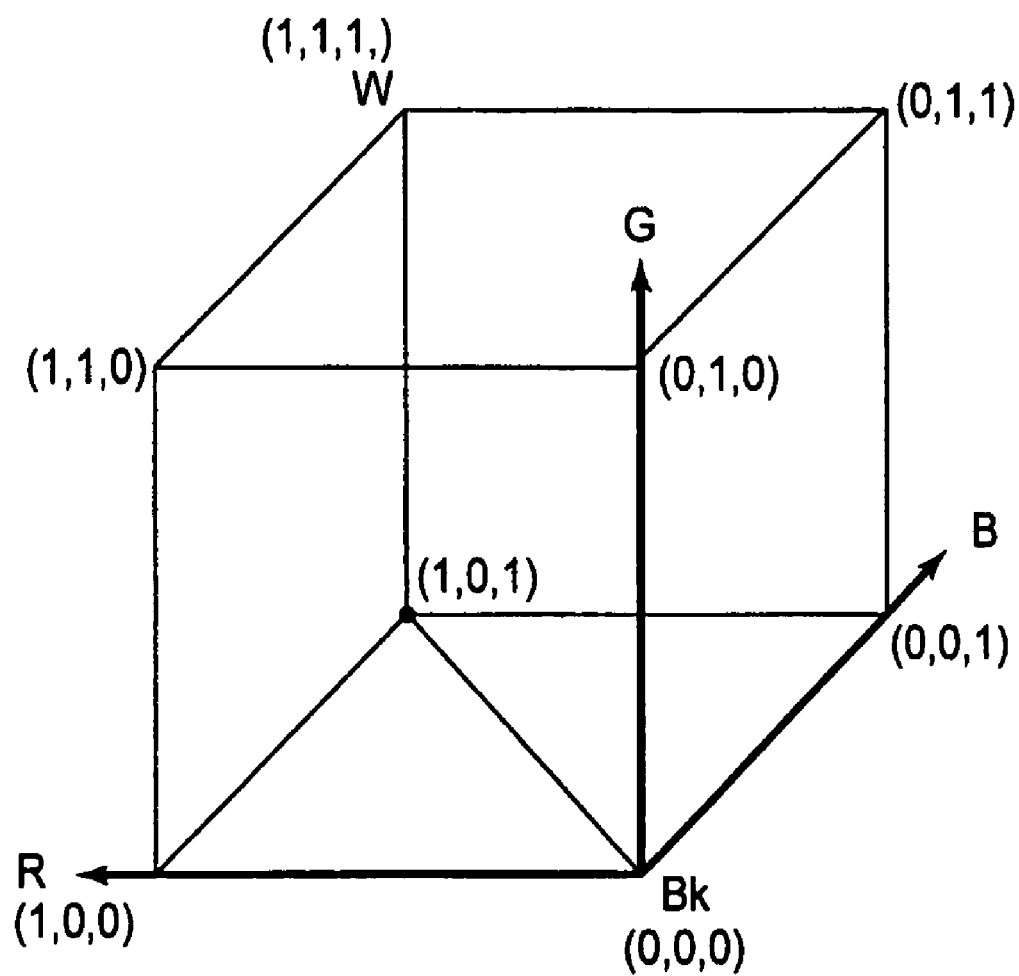
FIG. 2 is a view showing a color solid of RGB.

The displayable colors will be described by an RGB color solid shown in FIG. 2. As shown in FIG. 2, respective edges of the RGB color solid correspond to independent vectors of R axis, G axis and B axis, respectively. In the RGB micro-color filter method, one pixel is divided into three subpixels and magnitudes of independent vectors of these subpixels are independently controlled, whereby all the points of the RGB color solid can be displayed.

Here, in order to recognizably represent the regular hexahedron or cube (RGB color solid) in terms of numerical values, one edge of the cube obtained by the above described RGB color filter method is taken as 1. More specifically, all the points of the color solid obtained by the RGB color filter method are located inside the regular hexahedron having 8 vertexes of (0, 0, 0), (1, 0, 0), (0, 1, 0), (0, 0, 1), (1, 1, 0), (1, 0, 1), (0, 1, 1) and (1, 1, 1) in (R, G, B) space.

Figure 3:
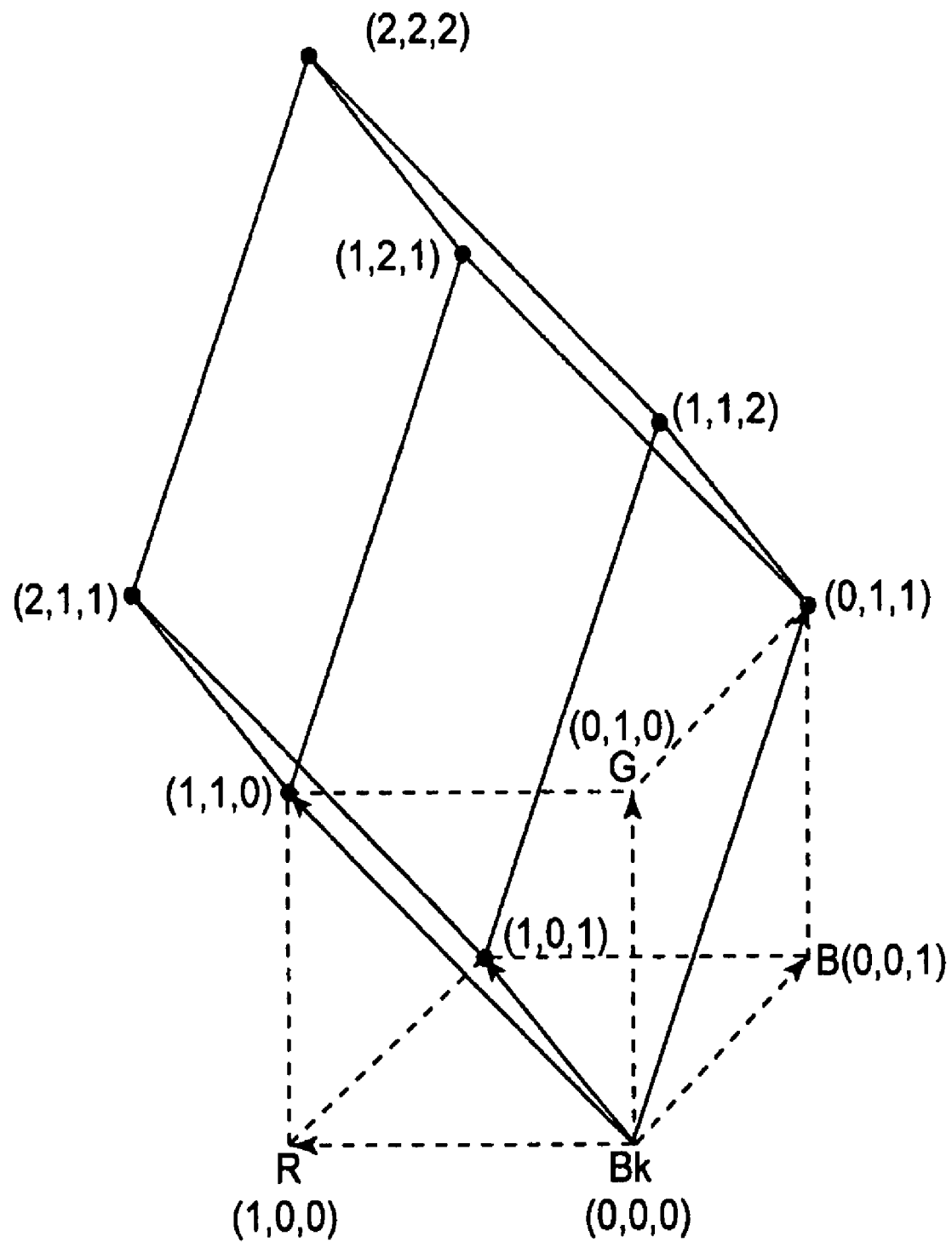
FIG. 3 is a view for illustrating a display range obtained by YMC color filters in the RGB color solid.

On the other hand, the liquid crystal display device used in this embodiment utilizes the YMC color filters, not the RGB color filters used in the conventional liquid crystal display device. In this case, principal (lattice) vectors in the RGB color solid when the YMC color filters are used is as shown in FIG. 3, so that a displayable area when monochromatic display is effected by the liquid crystal layer alone is located inside the regular hexahedron comprising the YMC principal vectors shown in FIG. 3.

Accordingly, in the case where the YMC color-filters are used in the conventional liquid crystal display device utilizing the micro-color filter method using the monochromatic modulation area, the displayable points are located inside a hexahedron having 8 vertexes of (0, 0, 1), (1, 1, 0), (0, 1, 1), (1, 0, 1), (1, 2, 1), (2, 1, 1), (1, 1, 2) and (2, 2, 2).

Accordingly, there is no displayable point on the primary color axes, so that it can be understood that primary color display with high color purity cannot be effected.

Figure 4:
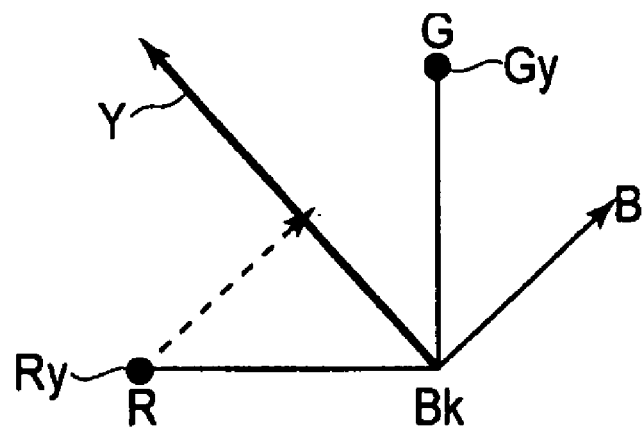
FIGS. 4, 5 and 6 are views for illustrating displayable ranges of the color display device at yellow subpixel, magenta subpixel and cyan subpixel, respectively, in the RGB color solid.

On the other hand, as described above, the liquid crystal display device in the present invention is characterized in that the primary color display can be effected even at the complementary color filter subpixels by utilizing the ECB effect-based coloring phenomenon. When this is represented on the color solid, e.g., at the yellow (Y) subpixel indicated by the reference numeral 26 in FIG. 1, it is possible to effect not only display of yellow continuous gradation but also display of red and green, so that the available points or the color solid are a (straight) line Y and points Ry and Gy shown in FIG. 4. As a result, the liquid crystal display device in this embodiment can effect primary color display with high color purity.

Figure 5:
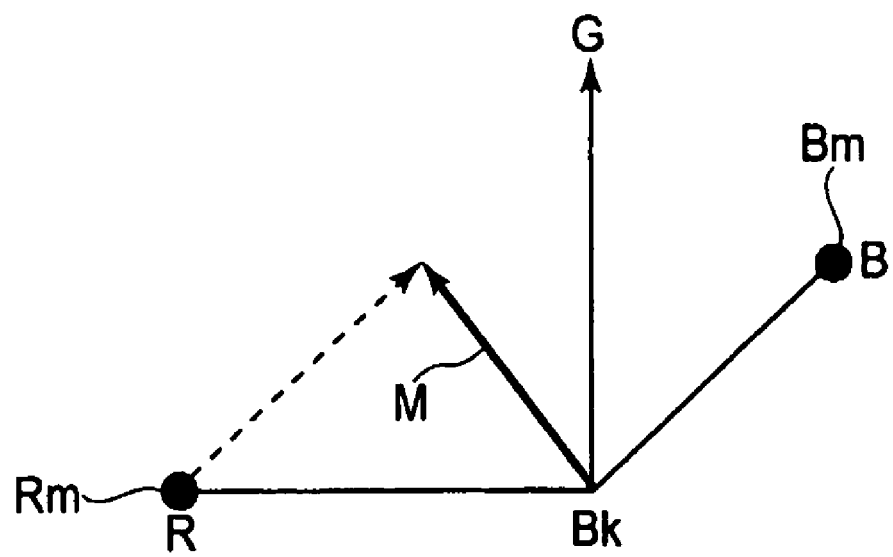

Similarly, at the magenta (M) subpixel indicated by the reference numeral 25 in FIG. 1, it is possible to effect not only display of magenta continuous gradation but also display of red and blue, so that the available points or the color solid are a (straight) line M and points Rm and Gm shown in FIG. 5. As a result, the liquid crystal display device in this embodiment can effect primary color display with high color purity.

Figure 6:
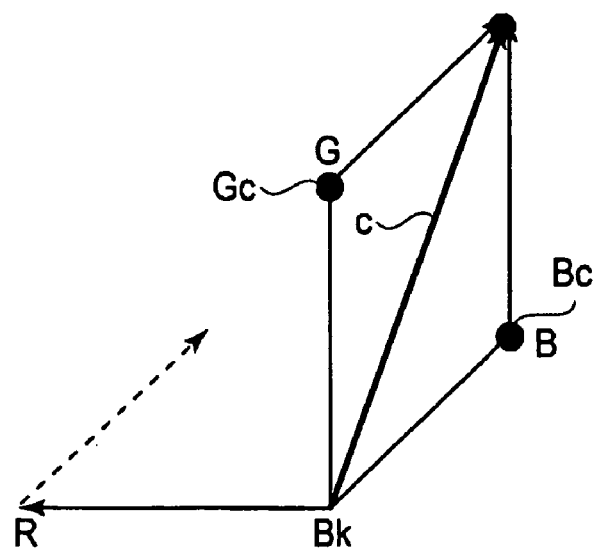

Further, at the cyan (C) subpixel indicated by the reference numeral 24 in FIG. 1, it is possible to effect not only display of cyan continuous gradation but also display of green and blue, so that the available points or the color solid are a (straight) line C and points Gc and Bc shown in FIG. 6. As a result, the liquid crystal display device in this embodiment can effect primary color display with high color purity.

As described above, the primary color display can be effected. For example, in the case of red display, there are two available types of red display (Rm) at the magenta subpixel and red display (Ry) at the yellow subpixel. Accordingly, it is possible to effect gradation display at three levels including lights-out (0, 0, 0) at both subpixels, lighting (1, 0, 0) at either one of the subpixels, and lighting (2, 0, 0) at both subpixels. Similarly, with respect to other primary colors of blue and green, it is possible to effect three-levels gradation display.

It is also possible to perform additive color mixture of these discontinuous points of the primary colors and continuous lines of the complementary colors. For example, in the case where red display is effected at both the magenta subpixel and the yellow subpixel, display of cyan continuous gradation, blue, or green is effected at the remaining cyan subpixel, whereby it is possible to obtain a display color by additive color mixture of the resultant color and red. The display color at this time is represented by (2, 0, 0)+k×(0, 1, 1) wherein k is an arbitrary value between 0 and 1.

As described above, in the color solid, it is possible to provide many display colors although the display mode is not complete analog full-color mode.

Accordingly, when a natural picture image is displayed in the above described display device, it becomes possible to obtain a visually natural photographic image quality by appropriately combining image processing such as dithering. Incidentally, when this picture image quality is attained, there is such a requirement that the number of gradation levels of the primary colors is increased. In order to satisfy such a requirement of the increase in number of the gradation levels, it is effective to divide the pixel (H. Mizutani et al., Ferroelectrics, Vol. 213, p.p. 179-186 (1998)).

However, when the gradation display is effected by such a pixel division, an increase in cost is liable to occur due to, e.g., an increase in number of driver ICs. For this reason, in the display device in the present invention, by effectively utilizing such a characteristic that the same color can be displayed by the color filter of different color, all the subpixels are not divided at the same areal ratio but divided at a different areal ratio at least one subpixel. As a result, it becomes possible to obtain many gradation levels with less increase in cost.

Figure 7:
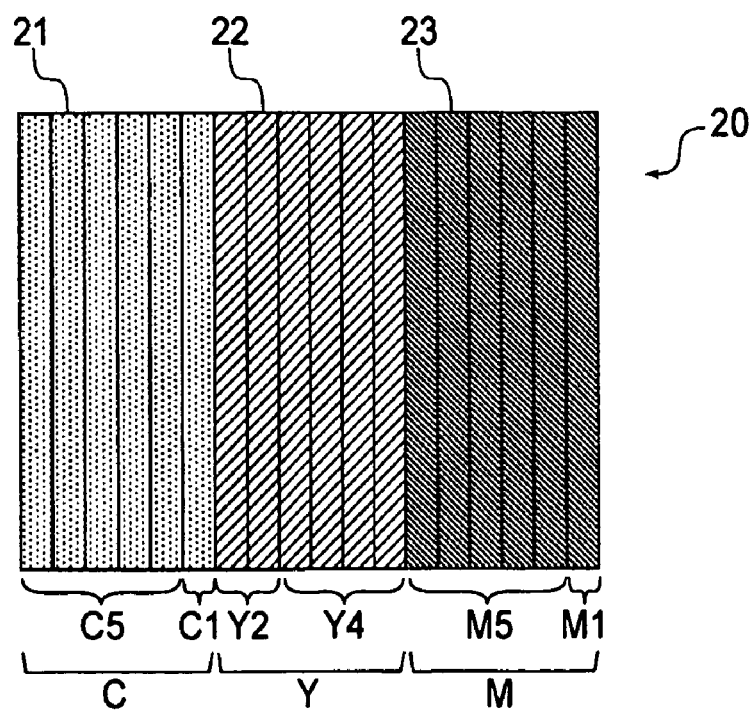
FIG. 7 is a view showing a state in which the yellow subpixel, the magenta subpixel, and the cyan subpixel are divided.

More specifically, e.g., as shown in FIG. 7, a cyan subpixel is divided into C1 and C5 at an areal ratio of 1:5, a yellow subpixel is divided into Y2 and Y4 at an areal ratio of 2:4, and a magenta subpixel is divided into M1 and M5 at an areal ratio of 1:5.

In this case, with respect to green display, it is possible to realize a combination of cyan and yellow, so that it becomes possible to effect gradation display by utilizing the two types of subpixels. An example thereof is shown in Table 1.

TABLE 1

| GRADATION | C1 | C5 | Y2 | Y4 |
|---|---|---|---|---|
| 0 | OFF | OFF | OFF | OFF |
| 1 | ON | OFF | OFF | OFF |
| 2 | OFF | OFF | ON | OFF |
| 3 | ON | OFF | ON | OFF |
| 4 | OFF | OFF | OFF | ON |
| 5 | OFF | ON | OFF | OFF |
| 6 | OFF | OFF | ON | ON |
| 7 | ON | OFF | ON | ON |
| 8 | ON | ON | ON | OFF |
| 9 | OFF | ON | OFF | ON |
| 10 | ON | ON | OFF | ON |
| 11 | OFF | ON | ON | ON |
| 12 | ON | ON | ON | ON |

As shown in Table 1, it becomes possible to display 13 gradation levels of green with less number of division. In the same manner, it is possible to display 13 gradation levels with respect to red.

As for blue, both of the cyan subpixel and the magenta subpixel are divided at the areal ratio of 1:5, so that the resultant gradation levels are only 9 levels of 0, 1, 2, 5, 6, 7, 10, 11 and 12, thus lacking four intermediary levels. As a result, linearity thereof is not ensured. However, with respect to a luminosity characteristic of human's eyes, blue is least sensitive, so that such a somewhat insufficient number of gradation levels is of no serious problem.

As described above, when the area division is made at different areal ratio, it is preferable that the gradation levels of green (and red) are designed to be properly represented. Incidentally, the number of division and the areal ratio are not limited to those described above but may be modified into various values. Further, a color balance of the color filters may appropriately adjusted, so that the areal ratios between the respective subpixels of YMC may be set to be not equal but somewhat different from each other.

By the above described combinations, it is possible to completely display a considerable number of points in the color solid, so that multi-color display can be realized.

As described above, in the liquid crystal display device in this embodiment, the plurality of pixels are constituted by subpixels for effecting color display at least in a modulation area based on the change in hue of liquid crystal and at least one of the subpixels is provided with any one of color filters of yellow, magenta and cyan so as to use a hue change range of liquid crystal when the three primary colors of red, green and blue are displayed.

As a result, it becomes possible to realize bright white display and bright primary color display capable of permitting halftone display in combination. Consequently, compared with the conventional display method for displaying the three primary colors only the RGC color filters, it is possible to provide a display device with a high light utilization efficiency. Accordingly, the resultant liquid crystal display device can be used as a reflection-type liquid crystal display device for paper-like display or electronic paper.

Second Embodiment

Figure 8:
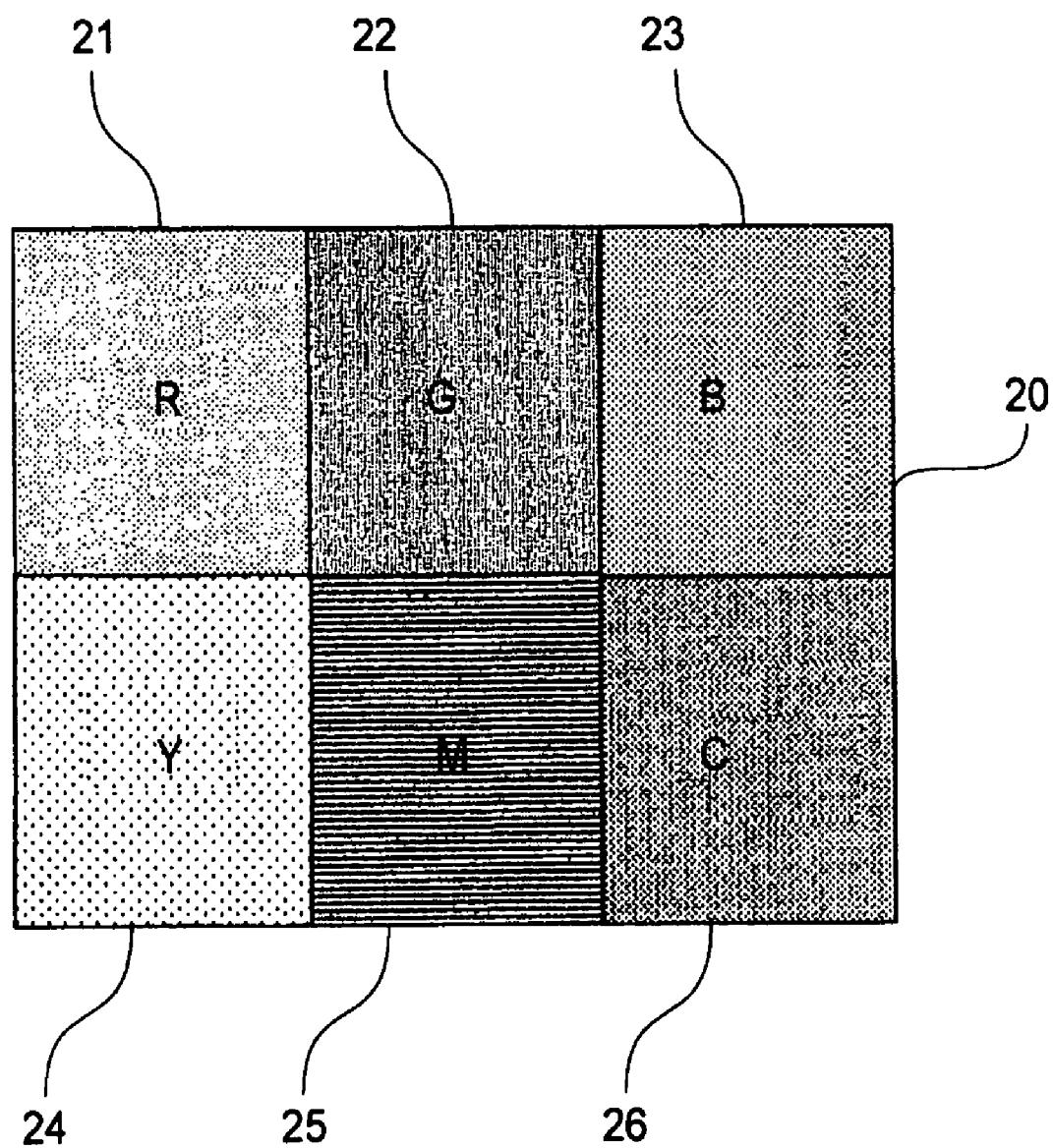
FIG. 8 is a view showing a one pixel structure of color (liquid crystal) display device used in a color display apparatus according to Second Embodiment of the present invention.

FIG. 8 shows a one pixel structure of a color display device used in a color display apparatus in this embodiment.

A display principle thereof will be described while taking a liquid crystal display device using liquid crystal having the ECB effect as an example, similarly as in First Embodiment.

As shown in FIG. 8, in the color (liquid crystal) display device in this embodiment, one pixel is divided into a plurality of subpixels 21 to 26 (six subpixels in this case) which are provided with color filters of red (R), green (G), blue (B), yellow (Y), magenta (M), and cyan (C), respectively.

Here, at all the subpixels 21 to 26, it is possible to utilize a change in luminance of achromatic color from black to white by appropriately adjusting a retardation of a liquid crystal layer. For example, at the time of displaying white, the colors of the color filters of RGB and YMC are displayed. In this case, when all the liquid crystal layers are placed in a white display state, at the subpixels 21 to 23 and at the subpixels 24 to 26, the white display state is obtained by additive color mixture of RGB and additive color mixture of YMC, respectively. As a result, the white display can be effected at the entire pixel.

Generally, in the case of white display only by additive color mixture of RGB, a resultant light utilization efficiency is lowered to ⅓ of that in the case of white display without using the color filters. However, in the case of the white display by additive color mixture of YMC, it is possible to obtain a light utilization efficiency which is two times that in the case of the white display by additive color mixture of RGB.

Accordingly, in this embodiment, it is possible to obtain, as a whole, a light utilization efficiency which is 1.5 times that in the case of white display only by the RGB additive color mixture.

In the liquid crystal display device of this embodiment, similarly as in First Embodiment, chromatic color is displayed by changing a retardation of the liquid crystal layer.

At the subpixel 25 provided with the magenta color filter, in a smaller retardation area, a display color ranges from black to white, as described in First Embodiment. In this case, the color of the color filter is observed, so that it becomes possible to effect continuous gradation display from black to bright magenta through dark magenta. Further, in a larger retardation area, interference color on the basis of the ECB effect can be displayed, so that it is possible to display any color from red to blue through magenta.

The magenta color filter is capable of displaying all these colors of red, magenta and blue, so that the display state red, magenta and blue is still observed even after light passes through the magenta color filter.

On the other hand, in the case where high-purity red is intended to be displayed on the basis of the principle of the conventional micro-color filter method, the liquid crystal display device has no choice but to illuminate the subpixel 21 with light. In the liquid crystal display device in this embodiment, however, at the subpixel 25, it becomes possible to effect bright red display with high purity in combination with red display utilizing the ECB effect.

Further, on the same display principle, at the subpixel 24, it becomes possible to effect display of red, yellow and green by utilizing the ECB effect. More specifically, it becomes possible to display further bright red in combination with red display at the subpixel 24 provided with the yellow color filter.

Incidentally, also with respect to green and blue, it becomes possible to display of bright primary color on the basis of the same display principle. According to this embodiment, compared with the conventional micro-color filter method, it becomes possible to compatibly realize about 1.5-times brighter white display and bright display of the three primary colors.

Next, displayable colors based on the above described display principle will be described more specifically.

In this embodiment, a unit pixel is constituted by first subpixels (first subpixel group) 24 to 26 at which chromatic color is displayed by changing the retardation of the liquid crystal layer through voltage application by modulation means capable of controlling an unshown power source and second subpixels (second subpixel group) 21 to 23 at which the color filters are provided and the colors of the color filters are displayed by changing the retardation in the brightness cyan range under voltage application. The first subpixels (first subpixel group) 24 to 26 are provided with the color filters of YMC complementary to RGB of the RGB color filters, respectively. The second subpixels (second subpixel group) 21 to 23 are provided with the color filters of RGB, respectively.

Also in this embodiment, principal (lattice) vectors in the RGB color solid is as shown in FIG. 3 since the YMC color filters are used, so that a displayable area is located inside the regular hexahedron comprising the YMC principal vectors shown in FIG. 3.

Accordingly, in the case where the RGB and YMC color filters are used in the conventional liquid crystal display device utilizing the micro-color filter method using the monochromatic modulation area, the displayable points are any points obtained by adding the vectors shown in FIG. 3 to those in the color solid shown in FIG. 2.

Accordingly, the number of display colors obtained by the color filters is maximum on the primary color axes, so that it can be understood that bright primary color display with high color purity cannot be effected as described above.

Figure 9:
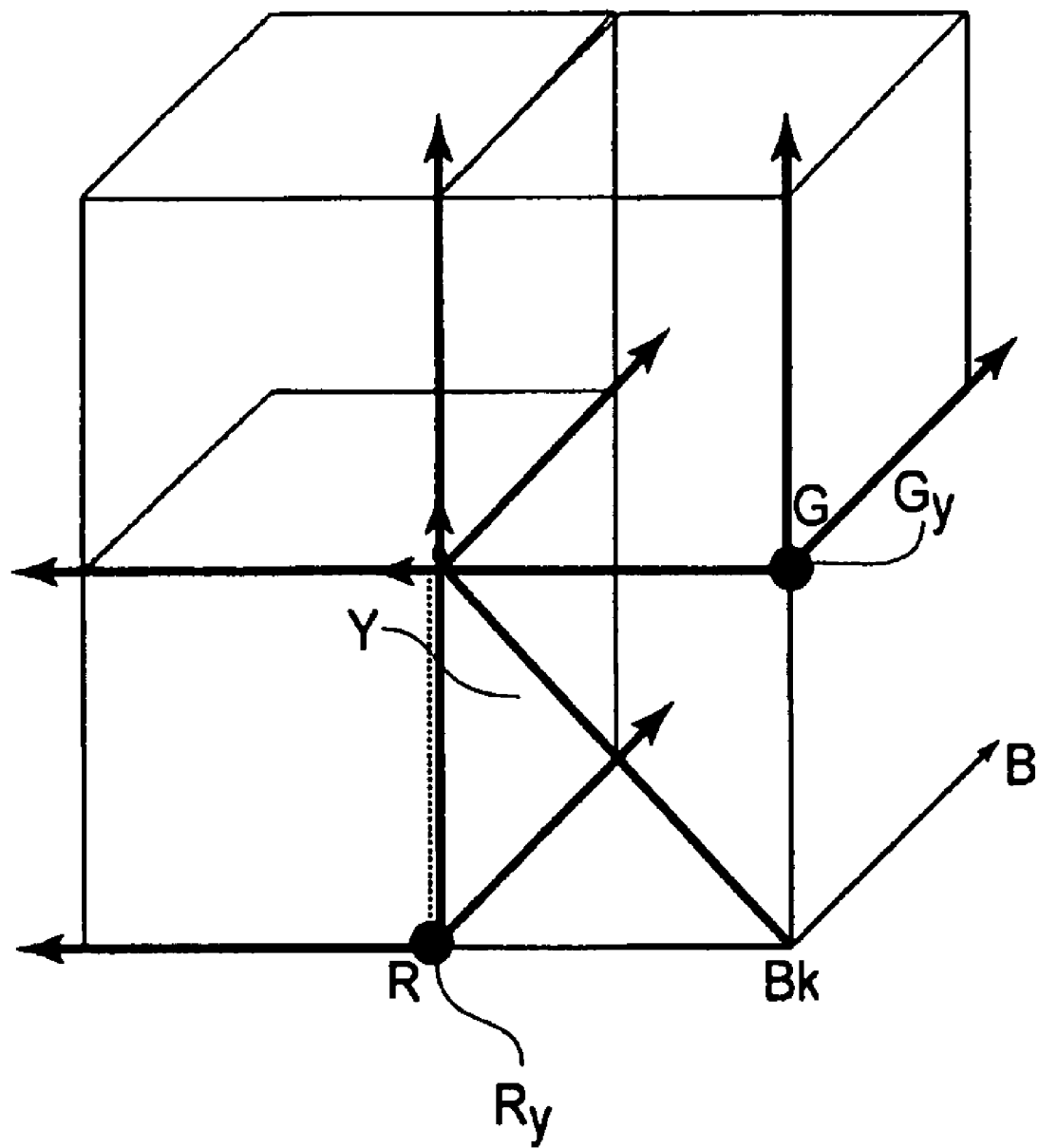
FIG. 9 is a view for illustrating a displayable range of the color display device at a combination of the yellow subpixel and RGB subpixels in the RGB color solid.

On the other hand, as described above, the liquid crystal display device in the present invention is characterized in that the primary color display can be effected even at the complementary color filter subpixels by utilizing the ECB effect-based coloring phenomenon. When this is represented on the color solid, e.g., at the yellow (Y) subpixel, it is possible to effect not only display of yellow continuous gradation but also display of red and green, so that the available points or the color solid are a (straight) line Y and points Ry and Gy shown in FIG. 4. As a result, in the liquid crystal display device in this embodiment, can shown in FIG. 9, it is possible to effect display in an area of RGB color solid including the points Ry and Gy as starting points.

On the same display principle, it becomes possible to provide an arbitrary point in the color solid.

More specifically, when a maximum luminance (brightness) for white display obtained by the liquid crystal display device in the present invention is 1, the brightness of 1 is obtained by, e.g., a total of those of a blue component of cyan, a blue component of magenta, and the blue color filter in a blue wavelength range. This is also true for green and red.

The color solid obtained by the RGB color filter pixels has a length of one edge corresponding to 1/3 of the maximum luminance, and the respective edges of, the color solid are capable of providing continuous values. Coordinates which can be realized on the color solid by the RGB color filter pixels are shown below.

| Color Component | Coordinate |
| --- | --- |
| R | any value between 0 and 1/3 |
| G | " |
| B | " |

Next, the YMC color filters are considered.

As described above, at the yellow (Y) subpixel, it is possible to display yellow, red and green. The display brightness in this case is also 1/3 of the maximum luminance on the same principle. Accordingly, values of brightness of the displayable colors at the yellow (Y) subpixel are taken, by using (R, G, B) coordinate, as yellow (1/3, 1/3, 0), green (0, 1/3, 0) and red (1/3, 0, 0). Incidentally, yellow can provide any value between 0 and 1/3 but only the maximum value is considered for the sake of simplicity in this case.

Similarly, at the magenta (M) subpixel, magenta (1/3, 0, 1/3), blue (0, 0, 1/3), and red (1/3, 0, 0) are obtained. At the cyan (C) subpixel, cyan (1/3, 1/3, 0), blue (0, 0, 1/3), and green (0, 1/3, 0) are obtained. Further, a plurality of subpixels of those of YMC are illuminated with light at the same time, whereby it is possible to provide a display color obtained by additive color mixture of the plurality of colors.

Figure 10:
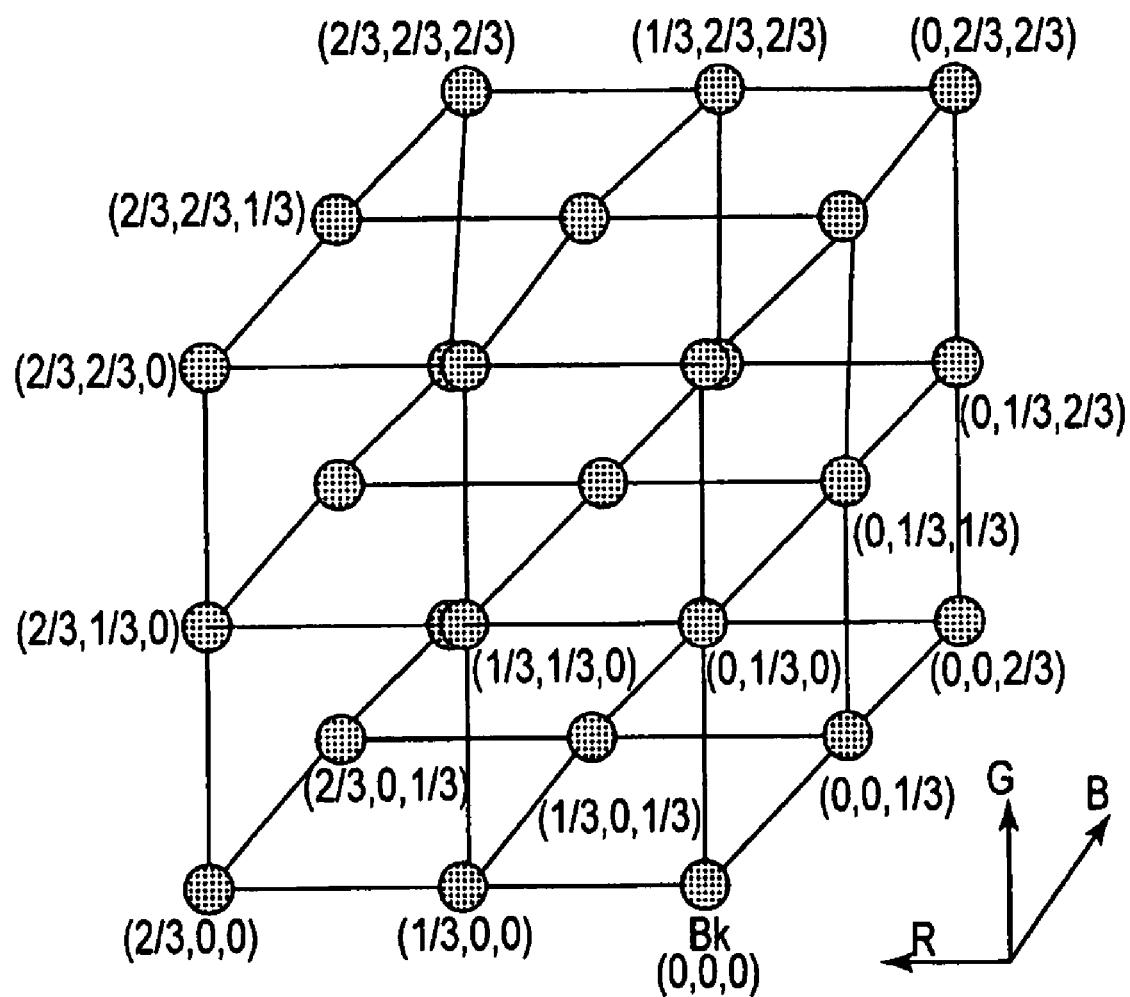
FIG. 10 is a view for illustrating displayable lattice points of the color display device at YMC subpixels in the RGB color solid.

As described above, by the RGB color filter pixels, all the arbitrary points in the color solid (cube) having a one-edge length of 1/3. Accordingly, in such a cube having vertexes including an origin point (0, 0, 0) and a point (2/3, 2/3, 2/3), when all the lattice points with a spacing of 1/3 shown in FIG. 10 can be represented, it becomes possible to fill the entire color solid having a one-edge length of 1 by additive color mixture.

In Tables 2 and 3, examples of combinations of display states at the YMC subpixels in order to obtain the above described lattice points by the YMC color filters are shown.

TABLE 2

| TO BE DISPLAYED | STATE AT(Y) | STATE AT(M) | STATE AT(C) |
| --- | --- | --- | --- |
| (0, 0, 0) | Bk (0, 0, 0) | Bk (0, 0, 0) | Bk (0, 0, 0) |
| (1/3, 0, 0) | R (1/3, 0, 0) | Bk (0, 0, 0) | Bk (0, 0, 0) |
| (2/3, 0, 0) | R (1/3, 0, 0) | R (1/3, 0, 0) | Bk (0, 0, 0) |
| (0, 1/3, 0) | G (0, 1/3, 0) | Bk (0, 0, 0) | Bk (0, 0, 0) |
| (1/3, 1/3, 0) | G (0, 1/3, 0) | R (1/3, 0, 0) | Bk (0, 0, 0) |

TABLE 2-continued

| TO BE DISPLAYED | STATE AT(Y) | STATE AT(M) | STATE AT(C) |
|---|---|---|---|
| (2/3, 1/3, 0) | Y (1/3, 1/3, 0) | R (1/3, 0, 0) | Bk (0, 0, 0) |
| (0, 2/3, 0) | G (0, 1/3, 0) | Bk (0, 0, 0) | G (0, 1/3, 0) |
| (1/3, 2/3, 0) | Y (1/3, 1/3, 0) | Bk (0, 0, 0) | G (0, 1/3, 0) |
| (2/3, 2/3, 0) | Y (1/3, 1/3, 0) | R (1/3, 0, 0) | G (0, 1/3, 0) |
| (0, 0, 1/3) | Bk (0, 0, 0) | Bk (0, 0, 0) | Bk (0, 0, 1/3) |
| (1/3, 0, 1/3) | Bk (0, 0, 0) | M (1/3, 0, 1/3) | Bk (0, 0, 0) |
| (2/3, 0, 1/3) | R (1/3, 0, 0) | M (1/3, 0, 1/3) | Bk (0, 0, 0) |
| (0, 1/3, 1/3) | Bk (0, 0, 0) | Bk (0, 0, 0) | C (0, 1/3, 1/3) |
| (1/3, 1/3, 1/3) | Bk (0, 0, 0) | Bk (1/3, 0, 0) | Bk (0, 1/3, 1/3) |
| (2/3, 1/3, 1/3) | R (1/3, 0, 0) | R (1/3, 0, 0) | C (0, 1/3, 1/3) |
| (0, 2/3, 1/3) | G (0, 1/3, 0) | Bk (0, 0, 0) | C (0, 1/3, 1/3) |

TABLE 3

| TO BE DISPLAYED | STATE AT(Y) | STATE AT(M) | STATE AT(C) |
|---|---|---|---|
| (1/3, 2/3, 1/3) | Y (1/3, 1/3, 0) | Bk (0, 0, 0) | C (0, 1/3, 1/3) |
| (2/3, 2/3, 1/3) | Y (1/3, 1/3, 0) | R (1/3, 0, 0) | C (0, 1/3, 1/3) |
| (0, 0, 2/3) | Bk (0, 0, 0) | B (0, 0, 1/3) | B (0, 0, 1/3) |
| (1/3, 0, 2/3) | Bk (0, 0, 0) | M (1/3, 0, 1/3) | B (0, 0, 1/3) |
| (2/3, 0, 2/3) | R (1/3, 0, 0) | M (1/3, 0, 1/3) | B (0, 0, 1/3) |
| (0, 1/3, 2/3) | Bk (0, 0, 0) | B (0, 0, 1/3) | C (0, 1/3, 1/3) |
| (1/3, 1/3, 2/3) | Bk (0, 0, 0) | M (1/3, 0, 1/3) | C (0, 1/3, 1/3) |
| (2/3, 1/3, 2/3) | Y (1/3, 1/3, 0) | M (1/3, 0, 1/3) | B (0, 0, 1/3) |
| (0, 2/3, 2/3) | G (0, 1/3, 0) | B (0, 0, 1/3) | C (0, 1/3, 1/3) |
| (1/3, 2/3, 2/3) | G (0, 1/3, 0) | M (1/3, 0, 1/3) | C (0, 1/3, 1/3) |
| (2/3, 2/3, 2/3) | Y (1/3, 1/3, 0) | M (1/3, 0, 1/3) | C (0, 1/3, 1/3) |

It becomes possible to realize all the lattice points by appropriately adjusting the display colors of the YMC color filters on the basis of the above described combinations. Incidentally, as described above, the combinations are merely examples. For example, in order to realize the point (⅓, 0, ⅓), it is possible to use not only a method of displaying magenta at the magenta (M) subpixel but also a method of displaying red at the yellow (Y) subpixel and blue at the cyan (C) subpixel. Accordingly, in the present invention, an optimum combination may appropriately be selected depending on the circumstances.

Further, in this embodiment, with respect to the display colors by the YMC subpixel, explanation is made by using the lattice points without using the gradation colors but may also be made by using halftones at the YMC subpixels according to the circumstances.

By the above described combinations, it is possible to represent completely may point in the color solid, so that full-color display can be realized.

Further, e.g., in the case where red is intended to the displayed at the yellow (Y) subpixel with respect to the display color by the yellow color filter, the display can be effected by controlling a voltage so as to provide a retardation of the liquid crystal layer permitting display of the same type color as red even without using the color filter. However, it is also possible to control the drive voltage so as to provide a display color different in type, e.g., magenta as the liquid crystal layer. In this case, it is possible to obtain red by subtractive color mixture of the display color of the liquid crystal layer and the color of the yellow color filter.

Incidentally, in the case of the above described constitution, it is necessary to form color filters of six colors on the substrate, so that a process therefor becomes difficult. For this reason, in the present invention, by adopting at least one of the following constitutions (1), (2) and (3), it becomes possible to effect bright multi-color display:

(1) a constitution omitting a part or all of the complementary-type color filters, (2) a constitution using four color filters of RCGM, and (3) a constitution using a lamination of YMC color filters.

In the constitution (1), at the YMC color filter pixels, it is possible to effect full-color display without using halftones. More specifically, it is not necessary to effect display of halftones of complementary colors, so that it is possible to obtain a similar display color only by the ECB effect-based coloring phenomenon. As a result, it becomes possible to realize full-color display while alleviating a color filter process load. Further, any one or two of the YMC color filters may be used. By doing so, the color filter process load is also alleviated, so that it becomes possible to realize full-color display with high color purity by the effect of the color filter (s).

The constitution (2) is a method wherein one pixel is divided into four subpixels and the concept of the displayable colors in the color solid is the same as that described above. According to this constitution, the color filters of B and Y are omitted, so that the continuous gradation display of blue and the above described display at the yellow subpixel cannot be effected. As a result, it is impossible to effect full-color display. However, a luminosity characteristic of human's eyes is less sensitive to blue, so that in such a constitution, it becomes possible to effect natural display by performing image processing such as dithering. This is particularly effective in a high-definition display device. According to this constitution, it is sufficient to perform the color filter process four times.

Figures 11, 12:
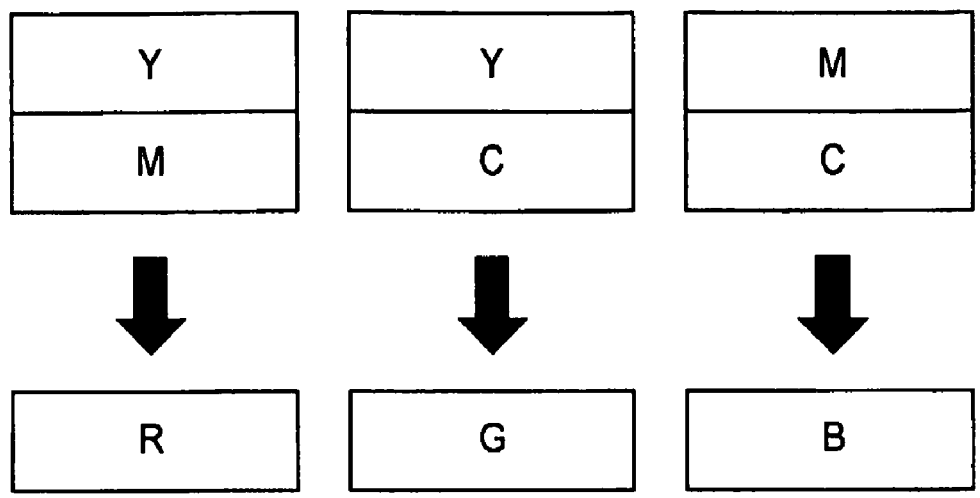
FIG. 11 is a view for explaining realization of the three primary colors by YMC color filters in the color display device.
FIG. 12 is a view for illustrating an embodiment of a color filter constitution in the color display device.

With respect to the constitution (3), explanation is made with reference to FIG. 11. In this constitution, one primary color can be obtained by laminating two complementary-type color filters and using subtractive color mixture. FIG. 11 shows such a lamination structure of the YMC color filters for obtaining RGB. By utilizing this lamination structure, it is possible to realize (six) colors of the six color filters only by the three-types of color filters of YMC. In this case, as shown in FIG. 12, these color filters are disposed and formed in the order of Y, M and C, so that it is sufficient to perform the color filter process three times similarly as in the conventional case. Accordingly, there is no increase in cost. Based on the concept of this constitution, it is also possible to form the color filters at four subpixels in the constitution (2) described above.

As described above, the liquid crystal display device in this embodiment is capable of realizing, display of bright white and display of bright primary colors at low cost. As a result, compared with the conventional method of displaying the three primary colors only by the RGB color filters, it is possible to provide a display device having a high light utilization efficiency. Accordingly, the liquid crystal display device in this embodiment can be used for the paper-like display or the electronic paper as the reflection-type liquid crystal display device.

In the liquid crystal display device in this embodiment, a transmittance of the liquid crystal layer is high, so that a power consumption of the back light necessary to obtain the same luminance as the conventional one is reduced. As a result, the liquid crystal display device is also suitably used as the transmission-type liquid crystal display device from the viewpoint of low power consumption.

Further, there is a high-speed responsiveness utilizing the liquid crystal, so that the liquid crystal display device in this embodiment can also be used for motion picture display. Conventionally, with respect to the liquid crystal display device for television purpose, in order to realize clear motion picture display, such a drive method, called a "pseudo impulse drive", wherein a shut-off period of a back light is provided in one frame period has been proposed by e.g., Japanese Laid-Open Patent Application No. 2001-272956. However, there arises a problem of an occurrence of lowering in luminance by the shut-off period. However, for such a purpose, by using the liquid crystal display device in this embodiment having the high response speed and a high transmittance, it is possible to solve the problem. Further, it is also suitably used as a projection-type liquid crystal display device required to have a high light utilization efficiency.

Next, a method of utilizing the ECB effect-based coloring phenomenon even when the retardation value is not for the primary colors will be described.

Figure 14:
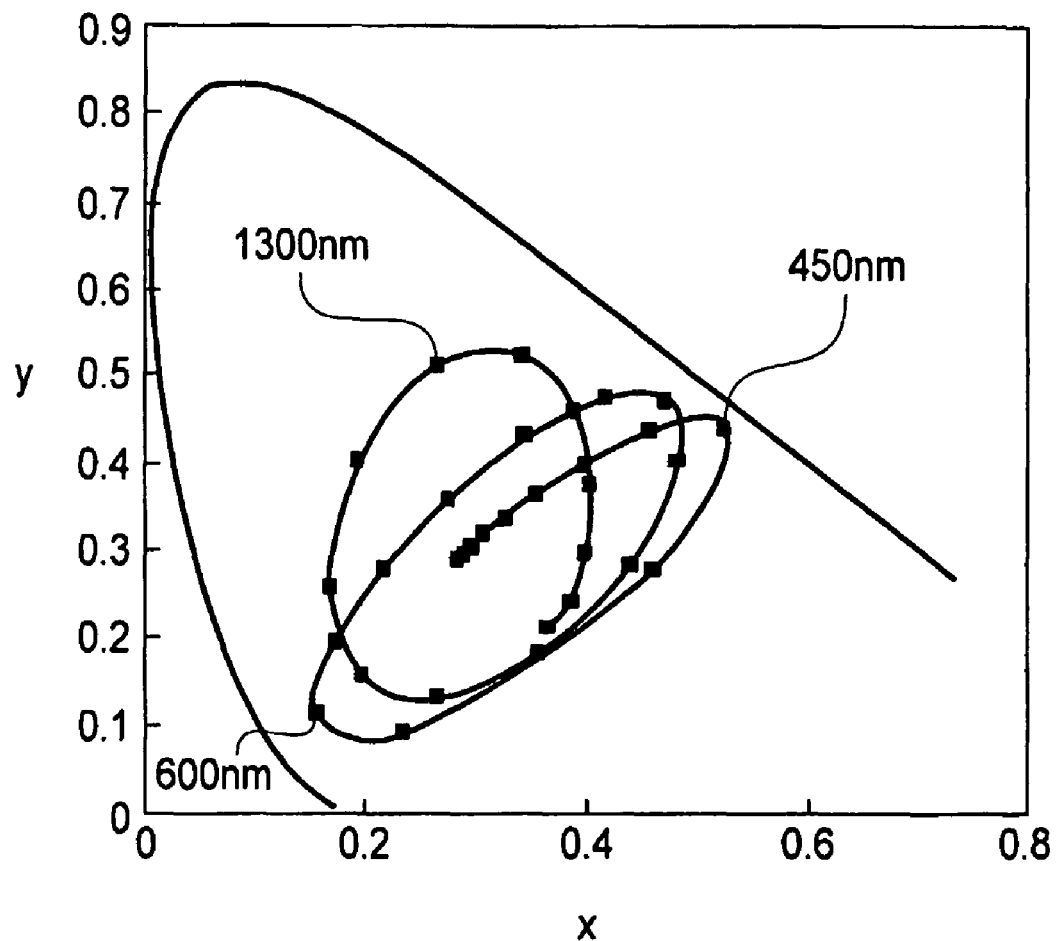
FIG. 14 is a chromaticity diagram showing a change in chromaticity when a retardation is changed.

For example, in FIG. 5 described above, such as example that green and red are displayed by the coloring phenomenon on the basis of the ECB effect at the yellow subpixel is described. However, by the ECB effect-based coloring phenomenon, as shown in FIG. 14, it is possible to change hue continuously between the respective display colors. In other words, other than the primary colors displayed in the above described manner, there are many available chromatic colors, so that by using such display colors, it becomes possible to increase color variations of full-color display in the above description.

In this case, by changing the retardation in the neighborhood of the red display area in the magenta color filter pixel, it is also possible to effect pseudo-gradation display by utilizing such an area that the hue is not substantially changed but the brightness is somewhat changed. As a result, it becomes possible to display more halftones.

Next, the method of adding the green color filter will be described.

By using the green color filter, it becomes possible to effect continuous gradation display of green at the green color filter pixel. The luminosity characteristic of human's eyes is highest with respect to green, so that it is very effective, for displaying natural picture image, that the continuous gradation display of green can be effected.

The size of the green color filter in this case is sufficient so long as it is a minimum size of subpixel for displaying green by the YMC color filters. More specifically, in the case where the cyan subpixel is divided into two portions C5 and C1 at the areal ratio of 5:1 as shown in FIG. 7, a necessary size of the green color filter is sufficient that it is a size which is ⅙ of the size of the cyan subpixel.

By the green color filter, it is possible to fill the above described stepwise gap between halftone levels, so that it becomes possible to realize the continuous gradation display of green. Further, the size of the green color filter may be a very small size, so that it becomes possible to suppress a loss of light utilization efficiency at a minimum level. This is also true for the cases of adding color filters of red and blue.

By the above described methods, it becomes possible to display a large number of display colors identical or comparable to the full color levels (multi-color display) while retaining the high light utilization efficiency.

The present invention is applicable to various liquid crystal display modes described below in addition to such a vertical alignment (VA) mode that the liquid crystal molecules in the liquid crystal layer are substantially homeotropically aligned with respect to the substrate surface under no voltage application and are inclined from the substantially homeotropic alignment state so as to change the retardation under application of voltage.

The present invention is applicable to an optically compensated bend (OCB) mode, in which the retardation is changed by changing the alignment state of liquid crystal molecules between a bend alignment state and the substantially homeotropic alignment state under application of voltage, similarly as in the case of the VA mode.

In the present invention, the display colors based on the change in retardation is utilized, so that a change in hue depending on a viewing angle must be taken into consideration. However, the progress of LCD development in these days is remarkable, so that it is not too much to say that the problem of viewing angle dependency is substantially solved in color liquid crystal display using the RCB color filter method. For example, in the OCB mode, it has been reported that the change in retardation due to the change in viewing angle is suppressed by a self-compensation effect by bend alignment. Further, by the progress of development of a phase-difference film in an STN mode, the viewing angle characteristic is remarkably improved. Also in these OCB and STN modes, it is possible to realize the coloring phenomenon base don the ECB effect by appropriately setting the amount of retardation, so that the constitution of the present invention is applicable thereto. Particularly, in the OCB mode, it is possible to considerably increase the above described response speed, so that in the present invention, the OCB mode is suitably adopted in the use requiring high-speed responsiveness.

On the other hand, an MVA (multidomain vertical alignment) mode has already been commercialized as a mode providing a very good viewing angle characteristic and has been widely used. In addition, a PVA (patterned vertical alignment) mode has also been used widely. In these vertical alignment modes, the wide viewing angle characteristic is realized by providing a surface unevenness (MVA mode) or appropriately shaping an electrode (PVA mode) to control an inclination direction of liquid crystal molecules under voltage application so that they are inclined at least in two director directions different in optical axis. In these modes, the amount of retardation is changed by the voltage, so that the constitution of the present invention is applicable to the modes.

As described above, in the present invention, it becomes possible to realize the color liquid crystal display device satisfying the higher transmittance (or reflectance), the wide viewing angle, and the broad color space at the same time.

Further, the viewing angle characteristic may also be further improved by applying an appropriately designed phase difference film to the liquid crystal display device.

As the alignment mode in which the liquid crystal molecules are placed in the vertical alignment state similarly as described above, a CPA (continuous pinwheel alignment) mode has been proposed by SHARP TECHNICAL JOURNAL No. 12 (Whole Number 80), pp. 11-14, August (2001).

According to this technical journal, similarly as in the above described PVA mode, the CPA mode is also a mode in which the liquid crystal molecule inclination direction under voltage application is controlled by appropriately shaping the electrode. In the CPA mode, at the time of applying the voltage, the liquid crystal molecules are placed in such an alignment state that they are inclined radially from a center portion of sub-pixel to realize a wide viewing angle. Also in the CPA mode, the retardation is changed by the voltage, so that the constitution of the present invention is applicable thereto.

In the above described technical journal (No. 12), there is such a description that it is possible to utilize birefringence and optical rotatory power in combination by using a reverse TN mode in which a liquid crystal material to which a chiral agent (dopant) is added in order to enhance a transmittance of liquid crystal, so that a light utilization efficiency is increased. The addition of the chiral agent is also applicable to the constitution of the present invention.

However, in the case where the display device is the reflection-type liquid crystal display device and uses a circular polarization plate in the constitution of the present invention, it is possible to obtain a good reflectance in the CPA mode without adding the chiral agent.

More specifically, such a constitution having a lamination structure of three layers consisting of a circular polarization plate, a liquid crystal layer, and a reflection plate will be considered.

In the case where there is no birefringence in the liquid crystal layer, e.g., the liquid crystal layer is in the vertical alignment state, externally incident light first passes through the circular polarization plate and is reflected without being modulated in a polarized light state. The reflected light passes through the circular polarization plate again to travel toward the outside of the display device. Thus, the light passes through the circular polarization plate two times, so that the light comes out of the display device particularly in such a wavelength region satisfying a circular polarization condition. In other words, in the CPA mode in which the liquid crystal molecules are vertically aligned in the no voltage application state, the above described constitution is the normally black constitution.

When the voltage is applied, the liquid crystal molecules are inclined radially, so that the liquid crystal molecules are inclined in all the directions with respect to an azimuth angle direction. In the case where the display device is the transmission-type and linearly polarized light enters the liquid crystal layer as in the above described technical journal (No. 12), the light utilization efficiency is lowered when a molecular axis direction of the liquid crystal is aligned with the polarization direction. However, in the case of such a constitution that the circularly polarized light enters the liquid crystal layer, the polarized light is uniformly modulated irrespective of the molecular axis direction in which the liquid crystal molecules are inclined. On the above described principle, in the case where the reflection-type display mode using the circular polarization plate and the CPA mode are applied to the constitution of the present invention, the chiral agent may be added as described in the technical journal (No. 12) and may not be necessarily added.

Incidentally, the liquid crystal display device in this embodiment can be driven by any of a direct drive method, a simple matrix drive method, and an active matrix drive method.

In the present invention, the substrate used may be formed of glass or plastics. In the case of the transmission-type display device, both the pair of substrates are required to be light transmissive. On the other hand, in the case of the reflection-type display device, as a supporting substrate, it is also possible to use a substrate through which light does not pass.

Further, the substrate used may have flexibility.

In the case of using the reflection-type display device, it is possible to employ various reflection plates, such as so-called front scattering plate comprising a scattering plate which is provided with a mirror reflection plate as a reflection plate and disposed outside the liquid crystal layer, or a so-called directional reflection plate having directivity by appropriately shaping a reflection surface.

In the above embodiments the vertical alignment (VA) mode is described as an example but the present invention is applicable to any mode, utilizing the change in retardation by voltage application, such as a homogeneous alignment mode, a HAN (hybrid aligned nematic) mode, or the OCB mode.

Further, in the above embodiments, such a normally black constitution that black display is effected at the time of no voltage application is described exemplarily. This normally black constitution can be realized by laminating a display layer, which does not assume birefringence in an in-plane direction of substrate under no voltage application, on a circular polarization plate. However, in the present invention, it is also possible to use such a normally white constitution that white display is effected at the time of no voltage application by replacing the circular polarization plate with an ordinary linear polarization plate. Alternatively, it is possible to use such a constitution that chromatic display is effected at the time of no voltage application by laminating a uniaxial phase-difference plate or the like on either one of the above constitutions. In this case, it is possible to display black or white by changing the alignment direction of liquid crystal molecules in such a direction that an amount of retardation of the laminated uniaxial phase-difference plate is cancelled by voltage application.

Further, in the present invention, it is also possible to adopt various alignment modes including such a liquid crystal mode as to provide a twisted alignment state as in the STN mode, a guest-host mode, and a selective reflection mode since it is possible to use a liquid crystal display device so long as it is a display device capable of realizing brightness modulation and hue modulation at one pixel.

In the above description, detailed explanation is made principally based on the ECB effect of the liquid crystal. However, a basic concept of the present invention is in that at a part of pixels, color display is effected by applying the color filter to the monochromatic display mode and in other pixels, a display mode capable of changing hue is utilized. Accordingly, in the present invention, other than the above described constitution using the ECB effect, it is possible to apply any display device to the color display apparatus of the present invention so long as the display modes described above are applicable to the liquid crystal display device of the present invention.

For example, it is possible to apply the following color display apparatuses (A) and (B):

(A) a color display apparatus in which a space distance of an interference layer is changed by mechanical modulation, and (B) a color display apparatus in which colored particles are moved so as to switch a display state and a non-display state.

More specifically, the color display apparatus (A) is, e.g., a constitution as described at page 71 of SID 97 Digest, wherein a distance of a spacing between the interference layer and a substrate is changed to switch display and non-display modes of interference color. In this mode, ON/OFF switching is performed by external voltage control of a deformable aluminum film so that the film comes near to or away from the substrate. Further, a color development principle in this mode is based on utilization of interference, so that the same color development mechanism as the ECB effect-based interference described above is also employed.

Accordingly, also in the above spacing distance modulation device as the color display device, it is possible to change an optical property by an externally controllable modulation means, such as a voltage, so that the device has a modulation area in which a brightness can be changed by the modulation means between a maximum brightness and a minimum brightness which are available by the device and a modulation area in which a plurality of hues which are available by the device can be changed. With respect to such a device, a unit pixel is divided into a plurality of subpixels, and at least one of the plurality of subpixels is constituted by a first subpixel (group) at which color display using the hue change-based modulation area can be effected and a second subpixel (group) provided with a color filter layer. As a result, similarly as in the color liquid crystal display device described more specifically above, it is possible to realize a display device having a high light utilization efficiency and capable of effecting multi-color display.

In the color display apparatus (B) mode described above, e.g., a particle movement-type display device described in Japanese Laid-Open Patent Application No. Hei 11-202804 are suitably utilized. In the display device, switching between a display state and a non-display state is performed by applying a voltage between a collection electrode and a display electrode to move in parallel with a substrate surface on the basis of an electrophoretic characteristic.

It is also possible to modify the display device so as to have a constitution using two types of color particles. More specifically, the resultant display device has a unit cell constitution including: two display electrodes disposed at mutually overlapping positions when viewed from an observer's side; two collection electrodes; two types of charged particles which are different in charge polarity and color and include at least one type thereof being transparent; and a drive means capable of forming a state in which all the two types of charged particles are collected at the collection electrode, a state in which they are collected at the display electrode, a state in which one of the two types of charged particles are collected at the display electrode and the other type of charged particles are collected at the collection electrode; and an intermediary state of these states.

Such a constitution that the combination of the two types of charged particles in the unit cell is that of blue charged particles and red charged particles is considered. In this case, when white display is effected, it is sufficient to drive the display device so that all the blue and red charged particles are collected at the collection electrode to place the display electrode in an exposed state. Further, in the case of displaying a single color of red or blue, in the unit cell, only desired single-color particles are disposed on the display electrode to display the single color. For example, in the case of blue display, the blue particles may be disposed on a display electrode to form a light-absorbing layer and the red particles may be collected on a collector electrode. On the other hand, in the case of driving black, in the unit cell, all the blue and red charged particles are disposed on the display electrode to form a light-absorbing layer, so that light enters each of the light-absorbing layers of red charged particles at a first display electrode and that of blue charged particles at a second display electrode, thus assuming black according to subtractive color mixture. In the case of halftone display, only a part of the particles at the time of displaying black are disposed on the display electrode. As a result, in the unit cell, it is possible to effect modulation of hue between the chromatic colors of red and blue and modulation of brightness by display of white, black and halftone.

Accordingly, while using the medium having the brightness change range in which the brightness is changed by the modulation means and the hue change range in which the hue is changed by the modulation means, the unit pixel is divided into a plurality of pixels including a first subpixel (group) for effecting color display by using the hue change-based modulation area and a second subpixel (group) provided with the color filter layer. As a result, similarly as in the case of the liquid crystal display device described above, it is possible to realize a color display device having a high light utilization efficiency and capable of effecting multi-color display.

Hereinbelow, the color display device according to the present invention will be described more specifically based on Examples.

In the following Comparative Examples and Examples, a common device structure is as follows.

Between two glass substrates subjected to vertical alignment treatment, a liquid crystal material (Model: "MLC-6608", mfd. by Merck & Co., Inc.) having a negative dielectric anisotropy ($-\Delta\epsilon$) is injected to form a liquid crystal layer so that a cell thickness was changed to provide an optimum retardation in each example.

As the substrate structure used, one of the substrates is an active matrix substrate provided with thin film transistors (TFTs) and the other substrate is a color filter substrate provided with color filters.

A shape of pixels and a color filter constitution are changed appropriately depending on each example. Incidentally, the color filter has a thickness of 1 μm, unless otherwise specified.

As a pixel electrode on the TFT side, an aluminum electrode is used to provide a reflection-type constitution. Incidentally, in some examples, a transflective-type constitution using a transmission-type pixel at which an ITO (indium-tin oxide) electrode was used as the pixel electrode on the TFT side.

Between an upper substrate (color filter substrate) and a polarization plate, a wide-band $\lambda/4$ plate (phase-compensation plate capable of substantially satisfying ¼ wavelength condition in visible light region) is disposed as a phase-compensation plate, thereby to provide such a constitution that a dark state is given under no voltage application and a bright state is given under voltage application when reflection-type display is effected.

Comparative Example 1

For comparison, an ECB-type active matrix liquid crystal display panel (display device) having a diagonal length (size) of 12 inches and 600×800 pixels is used. A pixel pitch is about 300 μm and each pixel is divided into three subpixels provided with color filters yellow (Y), magenta (M) and cyan (C), respectively. A liquid crystal layer is adjusted to have a thickness of 3 μm so as to provide a center wavelength of 550 nm and a retardation of 138 nm for a reflection spectrum characteristic at the time of applying a voltage of ±5 V.

Figure 13:
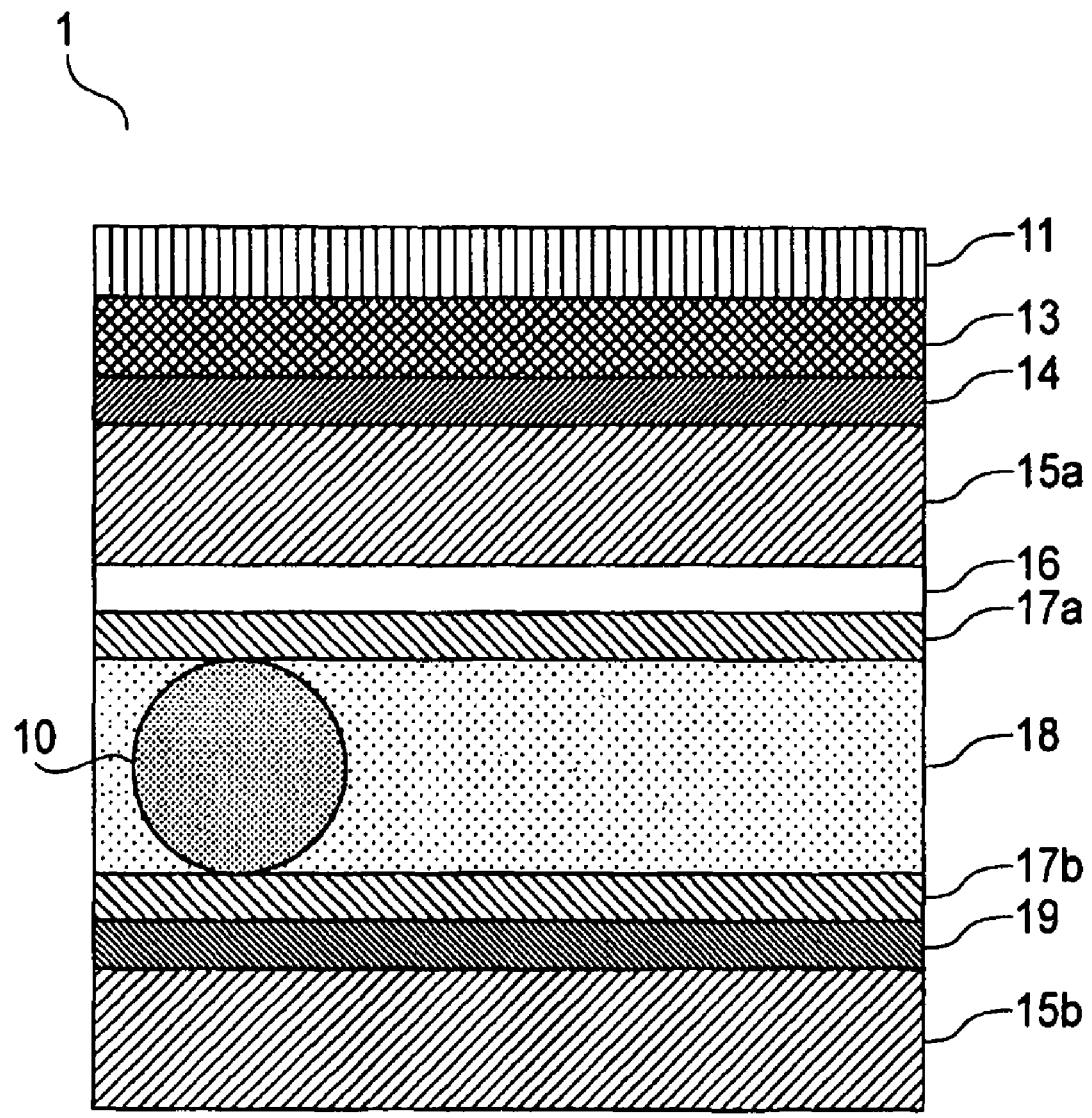
FIG. 13 is a view for illustrating a constitution of a liquid crystal display device used in Comparative Example of the present invention.

A cell structure of the liquid crystal display panel is as shown in FIG. 13 wherein vertical alignment films 17a and 17b are applied onto surfaces of electrodes 16 and 19 to be provided with a pretilt angle of about 1 degree from a normal to a substrate so that an inclination direction of liquid crystal molecules at the time of voltage application is 45 degrees with respect to an absorption axis of a polarization plate 11. Then, upper and lower substrates 15a and 15b are applied to each other to form a cell, into which a liquid crystal material having a negative dielectric anisotropy (−Δ∈) (Model: "MLC-6608", mfd. by Merck & Co., Inc.) is injected, whereby a liquid crystal 18 is aligned homeotropically with respect to the substrate surface when a voltage is not applied thereto. A liquid crystal display device 1 further includes a phase-compensation film 13, a front scattering plate 14 and a spherical spacer 10.

When the liquid crystal display device 1 is subjected to image display by variously changing a voltage, at the respective YMC subpixels, continuous gradation color can be obtained depending on an applied voltage, so that it becomes possible to effect smooth color display. Further, a good reflectance of 33% is obtained. However, a color purity of primary colors is very low, so that clear color display cannot be effected.

Comparative Example 2

In this comparative example, an active matrix substrate which has a diagonal size of 12 inches and 600×800 pixels and is not provided with color filter is used. However, by adjusting the thickness of the liquid crystal layer to 10 μm, it becomes possible to effect display of the three primary colors by retardation.

More specifically, red display is effected at 2.82 V, blue display is effected at 3.15 V, and green display is effected at 6.2 V. By changing the applied voltage, an image can be display in the liquid crystal display device. In a voltage range from 0 V to 2.5 V, it is possible to perform a brightness modulation continuously. However, a color purity for red display is poor, so that clear coloring cannot be effected. Further, a response speed is low, thus being unsuitable for motion picture display.

Example 1

In this example, an active matrix substrate which has a diagonal size of 12 inches and 600×800 pixels and is provided with three types of color filters of yellow (Y), magenta (M) and cyan (C) through repetition of photolithographic process three times.

The thickness of the liquid crystal layer is adjusted to 5 μm, thus permitting a change in hue by retardation. However, an amount of retardation is insufficient, so that it is difficult to effect green display. In this case, the color filters are not used, so that display is effected at 3.1 V for yellow, 4.2 V for blue, and 5 V for cyan. In the liquid crystal display device, an image can be displayed by changing the applied voltage. It is possible to effect a continuous brightness modulation in a voltage range from 0 V to 2.8 V.

When the voltage of 2.8 V is applied at all the pixels, white display can be effected. A resultant reflectance is about 33%, thus being approximately two times that of the conventional liquid crystal display device of RGB color filter-type. Further, by applying a voltage of not more than 2.8 V at all the pixels, it is possible to effect continuous monochromatic gradation display.

Next, a red display state will be described.

Red display can also be effected by applying a voltage of 3.4 V at the yellow pixel or the magenta pixel. In this case, at the yellow pixel, it is possible to effect high-purity red display by a subtractive color mixture effect of the yellow color filter with the liquid crystal layer set to display magenta by applying a voltage of 3.65 V thereto compared with the case where red display is effected in the liquid crystal layer by applying a voltage of 3.4 V.

Here, as described above, it is possible to obtain a maximum luminance state of red when both the Y and M pixels are placed in the red display state. Further, a resultant brightness (of red) is about two times that the red obtained by the conventional RGB color filter method. With respect to other two primary colors, display is effected in a similar manner, whereby it becomes possible to effect high-purity display of the three primary colors. Further, as described above, in this example, it can also be confirmed that gradation display at three levels is effected.

On the other hand, with respect to the complementary colors, at the time of yellow display, it becomes possible to obtain a maximum luminance state of yellow by placing the Y pixel in an on-state and effecting red display at the M pixel and green display at the C pixel. At the Y pixel, it is possible to provide continuous yellow gradation, so that it becomes possible to provide continuous gradation levels in the range from (0, 0, 0) to (1, 1, 1) by effecting continuous gradation control at the Y pixel while placing the M and C pixels in an off state. Further, by effecting continuous gradation control at the Y pixel while placing the M and C pixels in an on-state, it becomes possible to provide continuous gradation levels in the range from (1, 1, 0) to (2, 2, 0). As a result, with respect to yellow, it is possible to effect continuous gradation display in the entire range.

Similarly, with respect to other two complementary colors, it becomes possible to effect continuous gradation display in the entire range.

Example 2

In this example, the same constitution as in Example 1 is employed except that the thickness of only the cyan color filter is changed to 0.8 μm. As a result, a transmittance of cyan is increased, so that a resultant white balance is destroyed but by reducing the size of the cyan subpixel by about 20%, while display can be effected. In this manner, it is possible to provide the same display colors as in Example 1 even when the sizes of the color filters of three colors are not identical to each other.

Example 3

In this example, the same constitution as in Example 1 is employed except that the respective YMC subpixels are further divided into sub-subpixels.

When each of the YMC subpixels are divided into two sub-subpixels at an areal ratio of 1:2, analog gradation levels of YMC are obtained similarly as in Example 1 and with respect to each of the three primary colors of RGB, 7 gradation levels are obtained.

Further, as shown in FIG. 7, when the cyan subpixels is divided into two sub-subpixels at an areal ratio of 1:5, the yellow subpixel is divided into two sub-subpixels at an areal ratio of 2:4, and the magenta subpixel is divided into two sub-subpixels at an areal ratio of 1:5, it becomes possible to display green at 13 gradation levels. With respect to red, it also becomes possible to effect display at 13 gradation levels similarly as in the case of yellow. As for blue, as described above, display is effected at only 9 gradation levels, thus leaking intermediary gradation levels and failing to ensure linearity. However, the luminosity characteristic of human's eyes is least sensitive with respect to blue, so that the smaller gradation number of blue is not a large impairment in display of natural picture image.

Further, when the cyan subpixel is divided at an areal ratio of 1:5 and the yellow subpixel is divided at an areal ratio of 2:4 without dividing the magenta subpixel, it is possible to display green at 13 gradation levels from 0 to 12. With respect to red, it is possible to effect display at 7 gradation levels of 0, 2, 4, 6, 8, 10 and 12 with linearity.

Incidentally, with respect to blue, display is effected at 7 gradation levels, 0, 1, 5, 6, 7, 11, and 12 but linearity is not ensured. However, the luminosity characteristic of human's eyes is least sensitive with respect to blue, so that the smaller gradation number of blue is not a large impairment in display of natural picture image. BY such a constitution, it is possible to obtain a gradation display ability in accordance with the order of luminosity factor at the less number of pixel division.

Example 4

In this example, in addition to the constitution shown in FIG. 7, a green pixel having a size which is ⅙ of the YMC subpixels is added.

As a result, a continuous gradation display of green can be effected, thus resulting in smooth natural picture image display.

Example 5

Display is effected in the same manner as in Example 3 except that the size of the substrate is changed from 12 inches to 3.5 inches.

As a result, granularity is not visually observed, so that it becomes possible to effect display which can be said that it is a substantially full-color display.

Example 6

In this example, the same constitution as in Example 1 is employed except that each pixel is constituted by two subpixels provided with color filters of Y and C and one subpixel provided with no color filter.

In this case, even at the subpixel provided with no color filter, on the basis of the coloring phenomenon based on the ECB effect, it becomes possible to effect display at 0 V for black, 3.4 V for red, 3.65 V for magenta, and 4.2 V for blue. In other words, it is possible to obtain the same display state as at the subpixels provided with the YC color filters. As a result, according to this example, it also becomes possible to effect the substantially same multi-color display as in Example 1.

Similarly, even when the YC color filters are not used, it is also possible to effect color display by utilizing the ECB effect-based coloring phenomenon, so that the number of the color filters can be decreased compared with that of Example 1. As a result, it is possible to alleviate a load of color filter forming process and effect bright display.

Comparative Example 7

In this example, an active matrix substrate which has a diagonal size of 12 inches and 600×800 pixels and each pixel is divided into six subpixels provided with six types of color filter of red (R), green (G), blue (B), yellow (Y), magenta (M) and cyan (C) through repetitive of photolithographic process six times. By adjusting the thickness of the liquid crystal layer to 10 μm, it becomes possible to effect display of the three primary colors by retardation.

More specifically, red display is effected at 2.82 V, blue display is effected at 3.15 V, and green display is effected at 6.2 V. By changing the applied voltage, an image can be display in the liquid crystal display device. In a voltage range from 0 V to 2.5 V, it is possible to perform a brightness modulation continuously.

When the voltage of 2.5 V is applied to all the pixels, white display can be effected. A resultant reflectance is about 25%, thus being advantageous compared with the case of the conventional liquid crystal display device of RGB color filter-type. Further, by applying a voltage of not more than 2.5 V at all the pixels, it is possible to effect continuous monochromatic-gradation display.

Next, a red display state will be described. It is possible to provide continuous gradation levels of red by changing the voltage applied to the red pixel.

Red display can also be effected by applying a voltage of 2.82 V at the yellow pixel or the magenta pixel. It is also possible to effect red display by a subtractive color mixture effect of the yellow color filter with the liquid crystal layer set to display magenta by applying a voltage of 3.0 V to the Y pixel.

Here, as described above, it is possible to obtain a maximum luminance state of red when both the Y and M pixels are placed in the red display state and the R pixel is placed in its maximum luminance state. When a maximum luminance is 1, a luminance modulation from 0 to ⅓ is performed by arbitrarily modulating the red pixel while placing both the Y and M pixels in a black display state. A luminance modulation in the range of ⅓ to ⅔ is performed by arbitrarily modulating the red pixel while placing the Y pixel or the M pixel in a red display state. Further, a luminance modulation in the range of ⅔ to 1 is performed by arbitrarily modulating the red pixel while placing both the Y and M pixels in a red state. As a result, it is possible to provide continuous gradation colors of red. Incidentally, with respect to other colors, the liquid crystal display device can provide continuous gradation colors in the same manner as in the case of red display.

Example 8

In this embodiment, an active matrix substrate having a diagonal size of 12 inches and 600×800 pixels is used. Each pixel is divided into six subpixels including a red display pixel $P_R$, a green display pixel $P_G$, a blue display pixel $P_B$, a yellow display pixel $P_Y$, a magenta display pixel $P_M$, and a cyan display pixel $P_C$.

In Example 7 described above, the six color filters are obtained through the repetition of photolithographic process six times. However, in this example, these color filters are constituted by only three types of color filters of YMC.

More specifically, first of all, at the $P_R$ pixel, the $P_Y$ pixel, and the $P_G$ pixel, a yellow color filter is provided. Then, at the $P_M$ pixel, $P_B$ pixel, and the $P_R$ pixel, a magenta color filter is provided. Here, at the $P_R$ pixel, the yellow color filter has already been provided, so that the magenta color filter is formed so that it is laminated on the yellow color filter. Further, at the $P_G$ pixel and the $P_B$ pixel, the yellow color filter and the magenta color filter are provided, respectively, so that a cyan color filter is laminated on each of the Y and M color filters. Finally, planarization treatment is performed as described.

As a result, it becomes possible to form the color filters for permitting transmission of lights of red, green, blue, yellow, magenta and cyan at the $P_R$ pixel, the $P_G$ pixels, the $P_B$ pixel, the $R_Y$ pixel, the $P_M$ pixel, and the $P_C$ pixel, respectively. When the liquid crystal display device is driven in the same manner as in Example 7, it becomes possible to effect full-color display.

Example 9

In this example, an active matrix substrate which has a diagonal size of 12 inches and 600×800 pixels and each pixel is divided into four subpixels provided with four types of color filters of red (R), green (G), magenta (M) and cyan (C) through repetition of photolithographic process four times. By adjusting the thickness of the liquid crystal layer to 10 μm, it becomes possible to effect display of the three primary colors by retardation.

More specifically, red display is effected at 2.82 V, blue display is effected at 3.1.5 V, and green display is effected at 6.2 V. By changing the applied voltage, an image can be display in the liquid crystal display device. In a voltage range from 0 V to 2.5 V, it is possible to perform a brightness modulation continuously.

Continuous gradation display of red is effected at the R pixel in the luminance range of 0 to ½ when a maximum luminance is 1, while the G, M and C pixels are placed in a black display state. Further, in the luminance range of ½ to 1, red display is effected at the M pixel to provide a luminance of ½ and at the R pixel, continuous gradation display is effected. In this case, the G and C pixels are placed in a black display state.

Continuous gradation display of green is effected at the G pixel in the luminance range of 0 to ½ when a maximum luminance is 1, while the R, M and C pixels are placed in a black display state. Further, in the luminance range of ½ to 1, green display is effected at the C pixel to provide a luminance of ½ and at the G pixel, continuous gradation display is effected. In this case, the R and C pixels are placed in a black display state.

Continuous gradation display of blue is effected at a luminance of ½ when a maximum luminance is 1 by placing the M or C pixel in a blue display state. Other pixels are placed in a black display state. Further, a maximum luminance of 1 is obtained by placing the M pixel and the C pixel in the blue display state at the same time. In this case, other pixels are placed in a black display state. As a result, it is possible to obtain three gradation levels with respect to blue display.

In this example, full-color display cannot be effected and particularly, a gradation display ability of blue is insufficient. However, from the viewpoint of the luminosity characteristic of human's eyes, it is possible to obtain a display state visually close to the full-color display state.

Example 10

Display is effected in the same manner as in Example 9 except that the size of the substrate is changed from 12 inches to 3.5 inches.

As a result, granularity is not visually observed, so that it becomes possible to effect display which can be said that it is a substantially full-color display.

Example 11

In this example, a transflective-type liquid crystal display device is prepared by dividing RGB subpixels of pixels used in Example 7 into two groups including one group provided on the same reflection substrate as in Example 7 and the other group provided with an ITO electrode.

A cell (liquid crystal layer) thickness at the reflection portion is 10 μm similarly as in Example 7. On the other hand, a cell thickness capable of realizing a retardation amount necessary in a transmission mode is 5 μm. In other words, different from an ordinary transflective-type liquid crystal display device, in this example, the cell thickness is set so that it is larger in the reflection mode.

At the reflection portion, it is possible to effect full-color display by driving the liquid crystal display device in the same manner as in Example 7. On the other hand, at the transmission portion, the liquid crystal display device is in a normally black mode under no voltage application when the polarization plate is set in a cross-nicol state. Accordingly, the cell thickness may also be set to 10 μm both at the transmission and reflection portions. It is possible to employ a multi-gap structure. In either case, it becomes possible to effect full-color display at both the transmission and reflection portions while ensuring a high contrast.

Example 12

A transflective-type liquid crystal display device is prepared in the same manner as in Example 11 except that the thickness of the RGB color filters at the transmission portion is changed from 1 μm to 4 μm. As a result, color purity of the three primary colors at the transmission portion can be improved. Further, by appropriately adjusting a planarity, it becomes possible to set the cell thickness at the transmission portion at a smaller level. In other words, by providing the color filters at the transmission portion with a larger thickness, it becomes possible to compatibly realize a high color purity and the smaller cell thickness. As a result, it becomes possible to improve a response speed at the transmission portion.

Example 13

In this example, the same constitution as in Example 7 is employed except that each pixel is constituted by five subpixels provided with color filters of R, G, B, Y and C and one subpixel provided with no (magenta) color filter.

In this case, even at the subpixel provided with no color filter, on the basis of the coloring phenomenon based on the ECB effect, it becomes possible to effect display at 0 V for black, 2.82 V for red, 3.0 V for magenta, and 3.15 V for blue. In other words, it is possible to obtain the same display state as at the subpixels provided with the YC, color filters. As a result, according to this example, it also becomes possible to effect the substantially same multi-color display as in Example 1.

Similarly, even when the YC color filters are not used, it is also possible to effect color display by utilizing the ECB effect-based coloring phenomenon, so that the number of the color filters can be decreased compared with that of Example 1. As a result, it is possible to alleviate a load of color filter forming process and effect bright display.

INDUSTRIAL APPLICABILITY

As described hereinabove, according to the above mentioned Examples 1 to 13, it becomes possible to realize the bright reflection-type liquid crystal display device and the bright transflective-type liquid crystal display device. Incidentally, in these examples, the reflection- and transflective-type liquid crystal display devices of direct view-type are described but the constitutions thereof are applicable to a transmission-type liquid crystal display device of direct view-type, a projection-type liquid crystal display device, a liquid crystal display device provided with a view finder using a magnifying optical system, and so on. Further, in the above examples, the TFT is used in the drive substrate. However, instead of the TFT, it is possible to use MIM (metal-insulator-metal) or such a substrate constitution that a switching element is formed on a semiconductor substrate. It is also possible to change the active matrix drive method to the single matrix drive method or a plasma addressing drive method.

Further, in the above examples, the vertical alignment mode is principally described but the constitutions of the present invention are applicable to any mode so long as it is a mode, utilizing a change in retardation under voltage application, such as the homogeneous alignment mode, the HAN mode, the OCB mode, or the like. It is also possible to apply the above described liquid crystal alignment mode to such an alignment mode in which liquid crystal molecules are placed in a twisted alignment state as in the STN mode.

Further, similar effects as in the above described examples are achieved even by using such a mode as to change a spacing distance as a thickness of air as a medium of interference layer by mechanical modulation in place of the liquid crystal display device having the ECB effect. Further, it is also possible to attain the above described effects similarly as in the examples even when the particle movement-type display device having the above described constitution in which the plurality of particles as the medium are moved by voltage application is employed in the color display apparatus of the present invention.

While the invention has been described with reference to the structures disclosed herein, it is not confined to the details set forth and this application is intended to cover such modifications or changes as may come within the purpose of the improvements or the scope of the following claims.

The invention claimed is:

1. A color display apparatus of the type wherein a unit pixel is constituted by a plurality of subpixels including three first subpixels and three second subpixels, each of the first subpixels having a color filter of a color selected from three colors of yellow, magenta, and cyan, and each of the second subpixels having a color filter of a second color selected from three colors of red, green, and blue, so as to generate a display state of the pixel by an additive color mixture of the first subpixels and the second subpixels, and a medium for changing an optical property depending on a voltage applied thereto, said color display apparatus comprising:
    means for applying a voltage to each of the three first subpixels for changing the optical property of the medium within a brightness change range in which light passing through the medium is changed in brightness and a hue change range in which the light passing through the medium assumes chromatic color and a hue of the chromatic color is changed; and
    means for applying a voltage, to the three second subpixels, for changing the optical property of the medium within a brightness change range in which the light passing through the medium is changed in brightness,
    wherein the optical property of the medium in the first subpixels is changed without using gradation colors and the optical property of the medium in the second subpixels is changed continuously;
    wherein the first subpixel having the yellow color filter displays black, yellow, red and green,
    wherein the first subpixel having the magenta color filter displays black, magenta, red and blue, and
    wherein the first subpixel having the cyan color filter displays black, cyan, green and blue.

2. An apparatus according to claim 1,
    wherein said apparatus further comprises a pair of oppositely disposed substrates, and a layer of liquid crystal as the medium, and
    wherein said apparatus has a function of modulating incident polarized light into a predetermined state of polarization by utilizing a change in retardation on the basis of a change in alignment of liquid crystal molecules in the liquid crystal layer, and the three first subpixels execute color display using a modulation area on the basis of change in hue depending on the change on the basis of the change in alignment of liquid crystal molecules in the liquid crystal layer.

3. An apparatus according to claim 2, wherein the liquid crystal molecules in the liquid crystal layer have a negative dielectric anisotropy and are substantially aligned homeotropically with respect to the substrate when a voltage is not applied to the liquid crystal layer.

4. An apparatus according to claim 3, wherein the liquid crystal molecules are controlled so that they are inclined in at least two directions different in optical axis thereof when a voltage is applied to the liquid crystal layer.

5. An apparatus according to claim 2, wherein the liquid crystal molecules in the liquid crystal layer are placed in a bend alignment state at least when a voltage is applied to the liquid crystal layer.

6. An apparatus according to claim 2, wherein the liquid crystal molecules in the liquid crystal layer are substantially aligned homogeneously with respect to the substrate when a voltage is not applied to the liquid crystal layer.

7. An apparatus according to claim 2, wherein said apparatus is a transflective-type color display apparatus in which a single polarizing plate is used.

8. An apparatus according to claim 1, wherein said apparatus is a transflective-type color display apparatus comprising at least light illumination means, a pair of substrates each provided with an electrode, and a pair of polarization plates, and wherein at least one of the pair of substrates has a light reflective first area and a light transmissive second area.

* * * * *